US011748680B2

(12) United States Patent
Panigrahi et al.

(10) Patent No.: US 11,748,680 B2
(45) Date of Patent: Sep. 5, 2023

(54) SYSTEM FOR INTERNAL AUDIT AND INTERNAL CONTROL MANAGEMENT AND RELATED METHODS

(71) Applicant: INTONE NETWORKS INDIA PVT. LTD, Hyderabad (IN)

(72) Inventors: Ashok Panigrahi, Brookfield, CT (US); Solomon Reddy Yeruva, Hyderabad (IN); Abdul Khadeer Pasha Shaik, Hyderabad (IN); Nakka Rajesh Roshan, Hyderabad (IN); Santosh Raghava Chakravarty Erra, Hyderabad (IN); Madasu Prudhvinadh, Hyderabad (IN); Thirumala Reddy Vishal, Jangaon (IN); Naresh Bathula, Hyderabad (IN); Challa Pradeep, Hyderabad (IN); G. Goutham Reddy, Hyderabad (IN)

(73) Assignee: INTONE NETWORKS INDIA PVT. LTD

( * ) Notice: Subject to any disclaimer, the term of this patent is extended or adjusted under 35 U.S.C. 154(b) by 151 days.

(21) Appl. No.: 17/181,992

(22) Filed: Feb. 22, 2021

(65) Prior Publication Data

US 2022/0270005 A1 Aug. 25, 2022

(51) Int. Cl.
*G06Q 30/00* (2023.01)
*G06Q 10/0633* (2023.01)
(Continued)

(52) U.S. Cl.
CPC ....... *G06Q 10/0633* (2013.01); *G06F 3/0486* (2013.01); *G06F 11/3428* (2013.01);
(Continued)

(58) Field of Classification Search
CPC .......... G06Q 10/0633; G06Q 10/0635; G06Q 10/06395; G06Q 10/00; G06Q 10/02;
(Continued)

(56) References Cited

U.S. PATENT DOCUMENTS 10,019,677 B2 * 7/2018 Gill ...................... G06Q 10/067
2006/0271581 A1 * 11/2006 Sanjar ................... G06F 40/131
707/999.102

(Continued)

FOREIGN PATENT DOCUMENTS

WO 2006/119509 A2 11/2006
WO 2009061689 A1 5/2009

OTHER PUBLICATIONS

Vovchenko, Natalia G., et al. "Ensuring financial stability of companies on the basis of international experience in construction of risks maps, internal control and audit." (2017). (Year: 2017).*

*Primary Examiner* — Robert D Rines
*Assistant Examiner* — Jay-Ming Wang
(74) *Attorney, Agent, or Firm* — Richard P. Gilly, Esquire; Archer & Greiner, P.C.

(57) ABSTRACT

A computerized system and related computer operations manage internal audit and internal controls, especially for corporations and other business entities with regulatory reporting requirements, such as the Sarbanes-Oxley ("SOX") Act. Computer operations and associated user access to such operations are facilitated by integration of the multiple environments typically associated with internal audit and internal control management, such as the development environment, the run-time environment, and the management environment. The system employs a micro service architecture and distributed memory, and makes use of metadata and pipelined linkages for the data and associated controls under management, which features increase various system operation efficiencies and increase ease of (Continued)

operations by audit group and associated personnel, such as by permitting examination of data and evidence of audits and controls at multiple levels of detail from visually perceptible user interfaces, generally from a single displayed screen thereof. Mapping and scheduling subsystems have been programmed so that heterogeneous data sources may be accessed through a single user interface. Control mapping may be written initially and then reused as controls and data evolves, without substantial rewrite, by virtue of programming agnostic to scripting languages and data formatting.

18 Claims, 20 Drawing Sheets

(51) Int. Cl.
    *G06Q 10/0635*     (2023.01)
    *G06F 3/0486*     (2013.01)
    *G06F 16/25*     (2019.01)
    *H04L 67/02*     (2022.01)
    *G06F 11/34*     (2006.01)

(52) U.S. Cl.
    CPC ........ *G06F 16/252* (2019.01); *G06Q 10/0635* (2013.01); *H04L 67/02* (2013.01)

(58) Field of Classification Search
    CPC ........ G06Q 10/06; G06Q 10/10; G06Q 30/02; G06F 16/252; G06F 3/0486; G06F 11/3428; H04L 67/02; G05B 2219/31357
    See application file for complete search history.

(56) References Cited

U.S. PATENT DOCUMENTS

| | | | |
|---|---|---|---|
| 2011/0093471 A1* | 4/2011 | Brockway | G06Q 10/10 707/E17.083 |
| 2011/0126111 A1* | 5/2011 | Gill | G06F 21/577 715/736 |
| 2012/0216243 A1* | 8/2012 | Gill | G06F 21/55 726/1 |
| 2012/0224057 A1* | 9/2012 | Gill | G06Q 10/063 348/143 |
| 2015/0220857 A1* | 8/2015 | Balasubramanian | G06Q 10/063 705/7.13 |
| 2019/0166146 A1 | 5/2019 | Splunk et al. | |
| 2020/0117757 A1* | 4/2020 | Yanamandra | H04L 41/5064 |
| 2020/0218539 A1* | 7/2020 | Valerio | G06F 13/28 |
| 2021/0287177 A1* | 9/2021 | Musialek | G06Q 10/06312 |

* cited by examiner

SYSTEM FOR INTERNAL AUDIT AND INTERNAL CONTROL MANAGEMENT AND RELATED METHODS

FIELD

This disclosure relates to computer-based systems, and in particular, to computer-based systems for internal audit and internal control management. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Corporations, companies, and other business entities are often subject to a variety of regulations, such as the Sarbanes-Oxley ("SOX") Act. Such regulations often include provisions which relate to internal controls of operations of such corporate entities, and requiring appropriate management, assessment, and other compliance activities. Separate and apart from regulatory requirements, business efficiencies may likewise dictate internal business and financial processes, reporting requirements, and other related internal business control structures, the management and auditing of any of the foregoing being important elements of business operations and regulatory compliance.

In view of the foregoing, various computer-based systems for internal audit and internal control management, including a management assessment of internal controls under SOX Section 404, have been developed. These computer-based systems may suffer from various drawbacks and disadvantages, and thus pose challenges for the audit team or audit group charged with responsibility for internal audit and internal control management, whether internal or external to the business entity. For example, the disparate processes of a business and the need to define, control, and audit such processes may result in audit information being disbursed in unrelated computer systems or formats. Such dispersion may likewise cause error and duplication in audit processes and thus increase compliance risk to the organization. With regard to managing controls, if diverse computer programs are used for different processes, the assembly and submission of compliance reports or management assessment thereof will not have an integrative or efficient approach.

Furthermore, computer-based internal audit and internal control management software may not be scalable to dynamic or changing audit control demands as the businesses grow and diversify.

If multiple vendors are involved in different aspects of the audit control management processes, there is a possibility for proprietary coding to interfere with efficient operation of the management software.

The monitoring of internal controls is often not sufficiently continuous to identify needed and alterations in the controls, resulting in a reactive approach rather than a proactive approach.

SUMMARY

In one suitable implementation of the present disclosure, a computer system for internal audit and internal control management makes use of a platform having a development environment, a run-time environment, and a management environment. The system is capable of using not only a plurality of heterogeneous data sources, but storing such data sources in distributed databases, the stored data relating to auditable processes. Similarly, a plurality of repositories stores data associated with controls and rules that relate to management of audit controls. The different environments of the platform are associated with interconnected computer subsystems having programming routines associated therewith. The subsystems may include a data on-boarder, a connection adapter subsystem, a GRC forms subsystem, and a control designer. The system may improve its operations by making use of a data integration server. The management environment of the system may include subsystems with programming for incident management, issue management, scheduling, monitoring, and security, and such subsystems may be readily accessible to any authorized users of the audit team, development team, or management.

A RESTful application programming interface may be associated with certain implementations of the system hereunder, especially with those subsystems associated with the development environment. A plurality of dashboards having user-selectable fields associated therewith may display, in real time or near real time, key performance indicators associated with the controls under management and associated tasks, batches, and other audit control management functions. One dashboard may be in the form of a scoreboard which displays detailed records of respective key performance indicators in response to user selection of an associated fields.

The data on-boarder, according to certain implementations, creates data flow mappings corresponding to data source objects to be on-boarded. It may also edit data flow mappings which have been previously created by the data on-boarder. In either case, data source objects may be dragged and dropped into logical workspaces accessible through the application programming interface, and predetermined connections may be associated with the dropped data source object. The data flow mappings may be developed and subsequently validated using transformation objects selected from the group consisting of Joiner, Filter, Lookup, Router, Cash, Expression, and JAVA/Scala/Python/R transformations.

The control designer subsystem performs mappings making use of features and data associated with the data onboarder, but has programming to develop and validate control mappings associated with dataflow mappings or data source objects. One feature of the control designer is a control mapper which has programming capable of, among other mapping functions, maintaining control logic associated with a control mapping irrespective of substitution of one of the data source objects for another data source object.

In still further implementations, connection adapters and the associated connection adapter subsystem permits the system of this disclosure to access data sources which are heterogeneous, such as both relational and non-relational data sources, ERP and non-ERP applications, and data sources formatted in different industry standards, any of the foregoing being amenable to the dragging and dropping into logical work spaces for creation of data flow mappings or control mappings.

The scheduling subsystem permits selection and scheduling of multiple applications, batches, and tasks, in real time. The scheduling subsystem likewise permits continuous, intermittent, and one-time executions of the foregoing processes, any of the foregoing being accessible through a single, user-perceptible display screen.

In still further implementations, data on-boarder and control designer make use of data flow mapping metadata and control mapping metadata, use of such metadata improving system operations.

Still further implementations include programming for improving system operations relating to the monitoring of controls in real time, such as through a single user-perceptible monitor user interface. The programming may be operable to identify in real time a failure during execution of a control related task, generating corresponding incident reports, and enabling a re-start of the control related task at an audit control point associated with the failure, as opposed to a re-start from the beginning of such control related task.

The foregoing system and subsystem components and related programming may be useful for performing associated methods of internal control management corresponding to the various functions described above with reference to the overall system.

BRIEF DESCRIPTION OF THE DRAWINGS

The disclosure herein will be more readily understood with reference to the drawings, in which:

FIG. 16 is a screenshot of an exemplary implementation of a dashboard and associated user-perceptible screen thereof, and associated with the incident management subsystem of this disclosure;

FIG. 17 is a screenshot of another possible implementation of a dashboard and associated user-perceptible screen, and associated with the scheduling subsystem operations shown in flowchart form of FIG. 10 of this disclosure.

DETAILED DESCRIPTION

Figure 1:
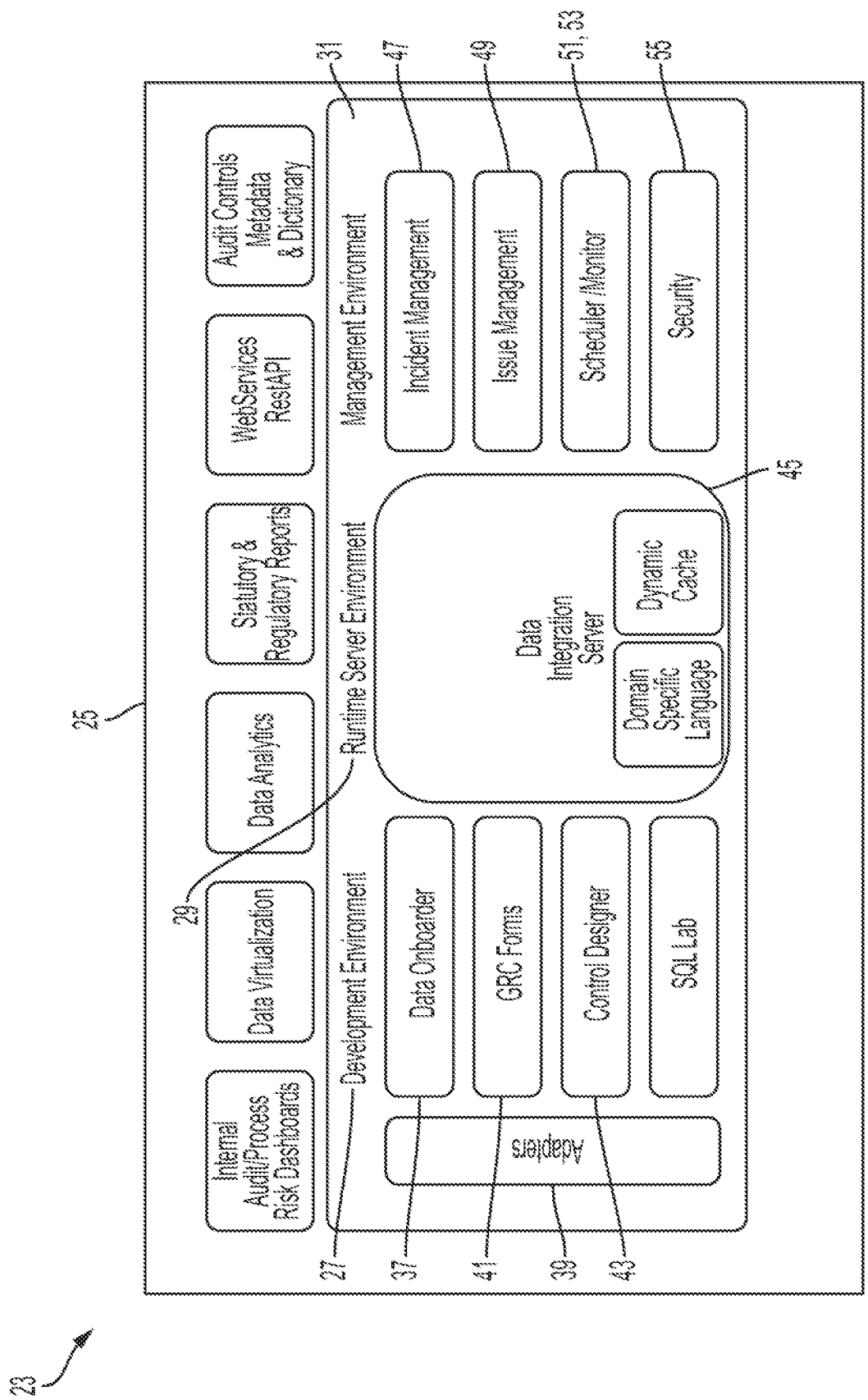
FIG. 1 is a context diagram of exemplary implementations of a computerized system for internal audit and internal control management.

Referring now to the drawings, and in particular to FIGS. 1-4, a computerized system for internal audit and internal control management 23, according to certain implementations of this disclosure, may be structured as a platform 25 integrating both internal audit management and internal control management, including related data on-boarding, control design, scheduling, and incident management, and other internal audit management and control management functions. Platform 25 may have programming subsystems or modules (used interchangeably herein) whose programming may be logically divided into a number of different environments corresponding to the functions performed by such subsystems and modules and including, in certain implementations, a development environment 27, a run-time environment 29, and a management environment 31.

System 23 has been structured and programmed to work with multiple data sources 33 stored in corresponding databases and having data related to any of the various auditable processes subject to assessment, management, and audit by system 23 of this disclosure. Similarly, system 23 is able to be operated more efficiently to connect data sources, and to map or otherwise design controls and associated data flows, by accessing multiple repositories 35, which repositories store records or other data associated with controls and rules related to control management and other operations of system 23. System 23 may be implemented through multiple, interconnected computer subsystems which are primarily associated with and executable in a corresponding one of the operating environments 27, 29, 31. Thus, in certain implementations, development environment 27 may have a first set of subsystems associated therewith, such as a data on-boarder 37, connection adapters 39, GRC ("governance, risk management, and compliance") forms 31, and control designer 43, the programming and related functions of the foregoing being detailed subsequently in this disclosure.

Similarly, run-time environment 29 may be generally associated with a second set of computer subsystems, including a data integration server 45.

Still further, a third set of subsystems primarily associated with management environment 31 may include subsystems comprised of incident management 47, issue management 49, scheduling 51, monitoring 53, and security 55.

System 23 makes use of one or more RESTful application programming interfaces ("API") 57, especially ones having user-selectable fields for purposes of operating subsystems in development environment 27, such as data on-boarder 37, GRC forms 43, connection adapters 39, and control designer 41. Users associated with such RESTful API may comprise any of those in the audit group or audit team, but may especially be operated by control or system developers, architects, and testers of the various internal audits and internal audit controls of system 23.

More generally, users, such as auditors, CEOs, COOS, process owners, data and line managers, or compliance officers, may have access to different environments or subsystems of system 23 depending on the access entitlement protocols for system 23 for different classes of users.

Figure 13:
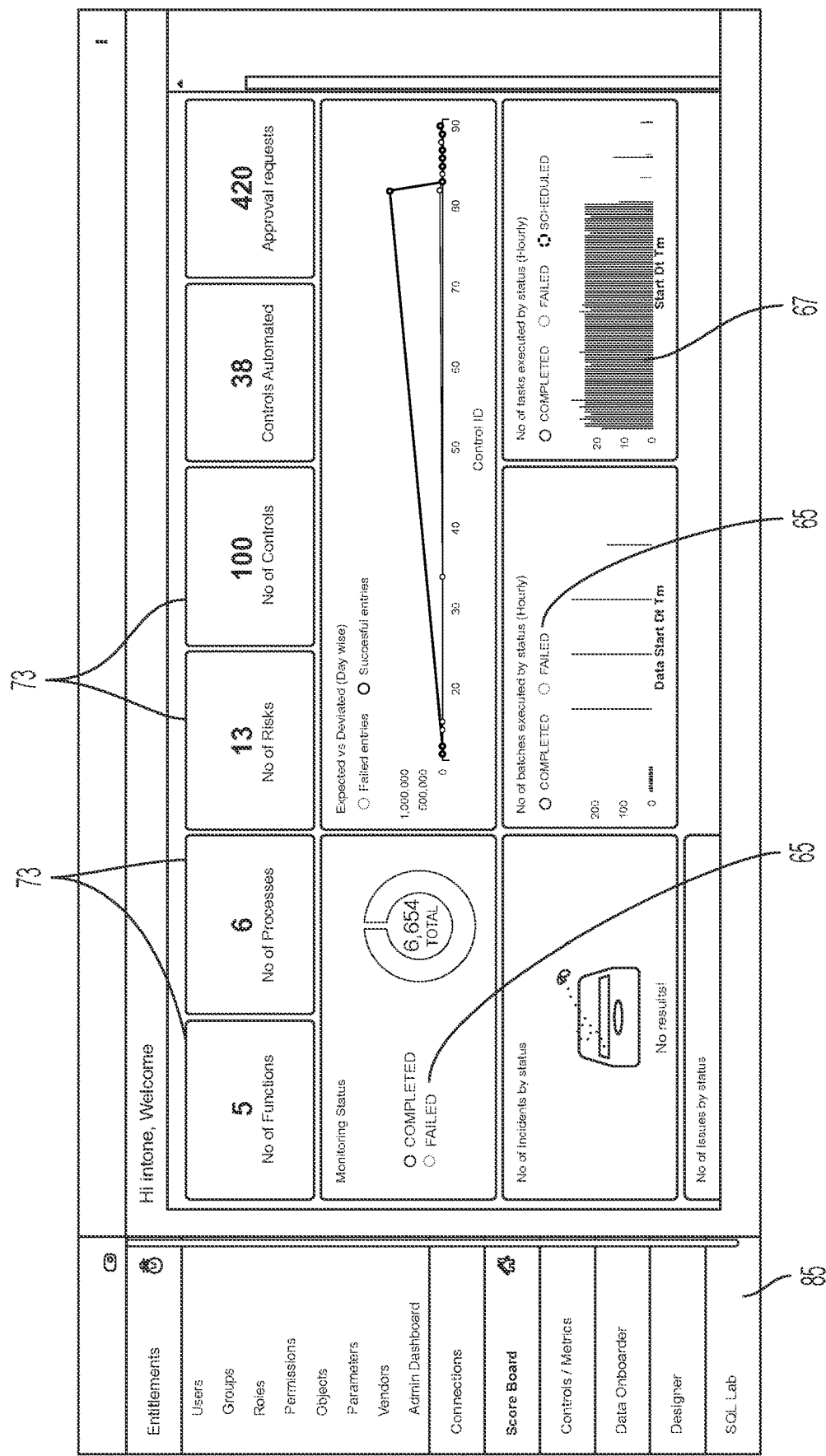
FIG. 13 is a screenshot of one possible implementation of a user-perceptible dashboard according to the present disclosure, corresponding to real-time scoreboard operations shown in flowchart form in FIG. 5.

The subsystems associated with management environment 31 may generate a plurality of dashboards 59, displaying indicia corresponding to data in real time, and having user-selectable fields and thus capable of connecting users of dashboards 59 to underlying data associated with the indicia by suitable user selection of corresponding user-selectable fields. For example, dashboards 59 may include a control monitoring scoreboard 61, a user-perceptible screen 63 of which is shown in FIG. 13. Suitable programming of monitoring subsystem 53 collects and displays key performance indicators and associated indicia, in real time, such key performance indicators and associated indicia corresponding to controls field 65, related records scanned 67, tests performed 69, and associated risk scores 71. Scoreboard 61 and programming associated therewith permits display of detail records of any of the foregoing key performance indicators in response to user selection of associated user-selectable fields 73.

Figure 5:
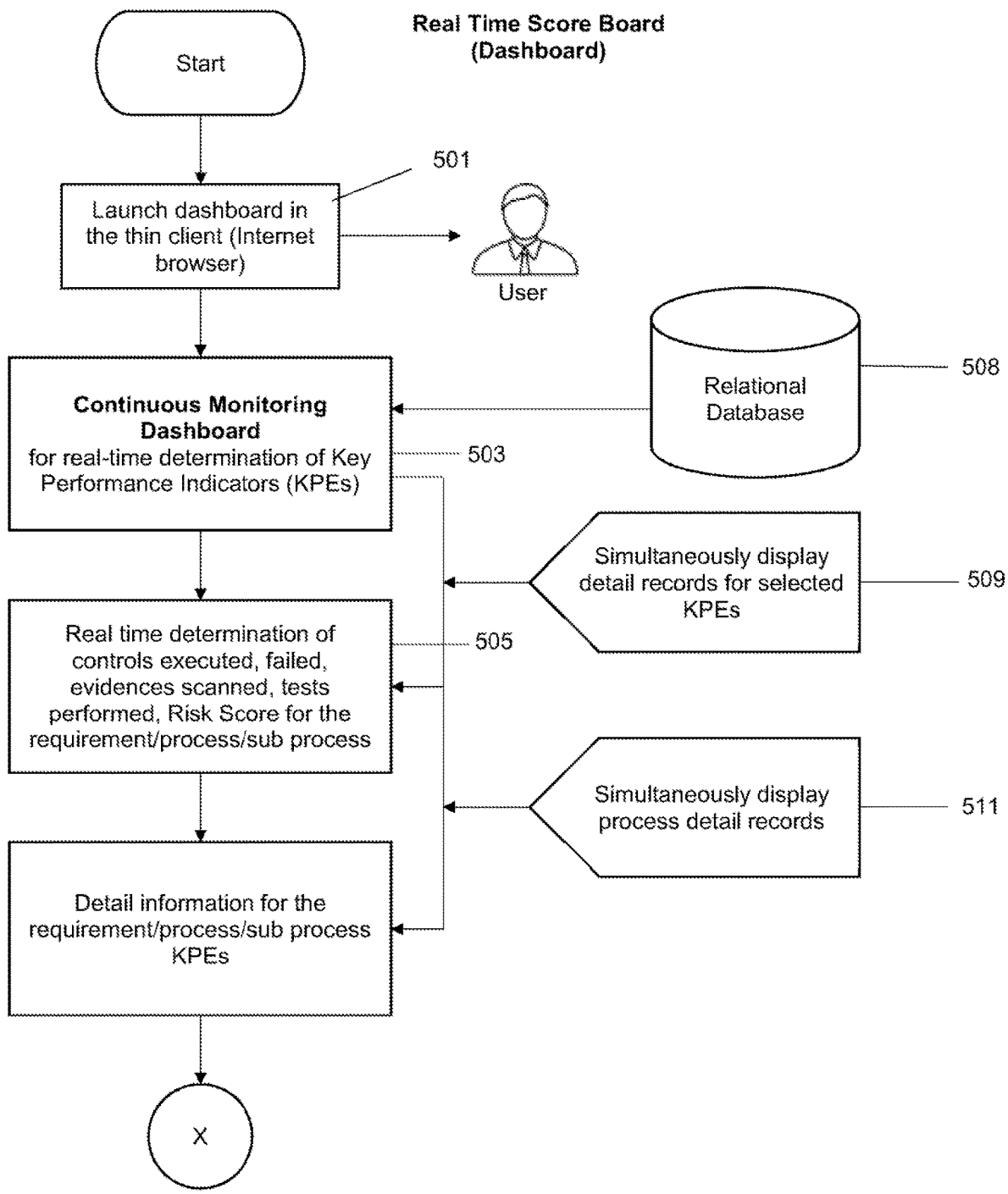
FIG. 5 is a flowchart disclosing one exemplary series of computer operations relating to continuous control monitoring and an associated real-time dashboard in the form of a scoreboard, the foregoing associated with the various implementations shown schematically in FIGS. 1-4.

Referring now to FIG. 5, suitable programming of monitoring subsystem 53 is shown in flowchart form in relation to corresponding functions performed by such programming and its associated routines and subroutines. Users may cause execution of suitable programming through an internet browser to launch control monitoring scoreboard 61 (step 501). Monitoring subsystem 53 executes instructions so as to make real-time determinations of key performance indicators (503), making calls to relational database 505 as appropriate. Real-time determinations include controls executed, failed, data scanned, tests performed, associated risk scores, and the foregoing may apply to the various requirements, processes, or sub-processes under audit or control (505). User selection of corresponding indicia may bring up still further detailed information relating to the foregoing key performance indicators (507). Monitoring subsystem 53 further permits simultaneous display of detail records of selected key performance indicators (509) as well as simultaneous display of process detail records (511).

Figure 8:
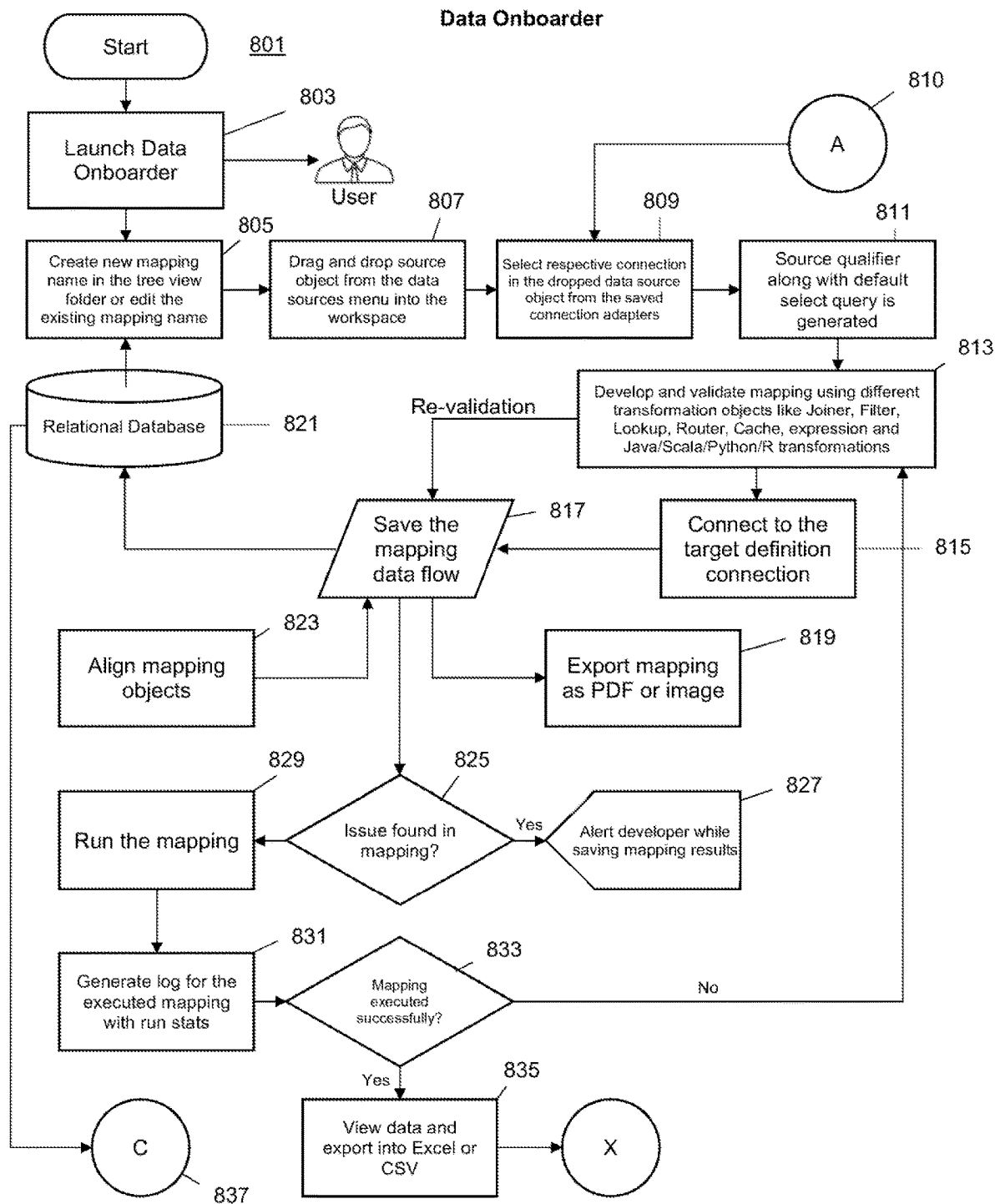
FIG. 8 is a flowchart of certain computer operations, as well as associated programming capable of performing such operations, and related to a data on-boarder system of the internal audit and internal control management computerized system of FIGS. 1-4.

Programming and associated functions of data on-boarder subsystem 37 is shown with respect to certain implementations in FIG. 8.

Users who have been authorized by suitable entitlement protocols of system 23 to access data on-boarder subsystem 37 may include control developers or other developers of system 23, testers of such developments, those developing mapping of either data sources or controls, and any other system analysts or system architects. Such users may cause execution of suitable programming, such as the exemplary data on-boarder programming shown by flowchart 801. Data on-boarder subsystem 37 may be launched (803), once suitable credentials of the user(s) have been verified, through a suitable application programming interface, such as one of the RESTful APIs 57. Suitable programming may be received from user input or activated in response to user selection of corresponding input fields, to create one or more data flow mappings corresponding to one or more data source objects to be on-boarded. So, in one suitable implementation, suitable programming is executed to either create a new data flow mapping, having a new mapping name associated therewith, in a corresponding tree view folder, or a user may cause execution of programming to edit an existing data flow mapping, by selecting its name (805) in a suitable database of data flow mappings (821). Selected data source objects are dragged and dropped into a corresponding logical workspace accessible from RESTful API 57 (step 807).

Programming then enables selection of one or more predetermined connections for one or more corresponding selected dragged and dropped data source objects. The connections may comprise one of a plurality of connections which may have been previously determined by connection adapter subsystem 39 and stored in associated connection adapter relational database 609 by suitable programming (step 810). In response to the various data on-boarding operations being performed by the user, a source qualifier is generated along with a default select query corresponding to one or more of the dropped data source objects (811); the foregoing processes may continue through successive iterations related to different data source objects to be on-boarded until such time as one or more corresponding data flow mappings have been generated. Suitable processing steps for generating such data flow mapping involve the development and validation of the data flow mappings using different transformation objects, such as Joiner, Filter, Lookup, Router, Cache, expression, and any other suitable JAVA, Scala, Python, or R transformations (813). Upon validation of the data flow mappings, suitable programming (815), connects to target definitions and the resultant data flow mapping may be saved (817) in relational database 821.

The saved or stored data flow mappings may be subject to still further processing by suitable programming subroutines of data on-boarder subsystem 37. Thus, for example, execution of the data flow mappings may be performed in order to generate associated real-time statistics (829, 831). If issues are found upon data flow mapping execution, alerts may be generated, and such alerts may be saved during the generation or saving of the mapping result (825, 827). Still further operations may involve aligning of mapping objects (823) or the export of the developed data flow mapping as PDF or other image, for purposes of further internal audit and internal control management, again, with suitable programming and related subroutines of data on-boarder 37 being executed in response to user selection (823, 819).

Instructions and programming of data on-boarder 37 may likewise result in successful execution of the created or edited data flow mapping (833), in which case the resulting data from such execution may either be viewed through one of the restful APIs 57, or exported for further processing, such as in Excel or CSV formatting (835). In this implementation, the programming of data on-boarder 37 permits the various steps for creation of data flow mappings to be performed and executed in a manner which is agnostic to script language associated with the data source objects, thereby permitting heterogeneous formatting or scripting within a single set of programming subroutines of data on-boarder 37. Similarly, target definitions connected to the data flow mappings may occur in multiple scripting languages.

Further mapping operations related to those discussed for data on-boarder subsystem 37 may be performed by means of control designer subsystem 43, the functions and associated programming of which are discussed with reference to the exemplary flowchart of FIG. 9, and associated screenshots of user interfaces shown in FIGS. 18, 19, and 20.

One or more users, similar to those that may wish to access data on-boarder 37, may access a suitable RESTful API and launch operations and associated programming of control designer 43, such as by access to a suitable internet browser (903), and an exemplary series of operations 901 may be performed, generally in response to user selections and inputs through the associated RESTful API 57 and internet browser thin client. While certain programming and associated operations of control designer 43 are generally similar to corresponding operations of data on-boarder 37, control designer 43 performs mapping relating to control mapping.

In step 905, access to a GRC form database 721 is performed in response to a user input to open an existing control mapping defined in one of the GRC forms of such database, such as in the tree view folder and in accordance with its associated category. Alternatively, in response to user request, editing of an existing control mapping is performed. The control mapping selected or retrieved is checked out for purposes of further operations by control designer 43, such as placing the selected control mapping into a logical workspace accessible through one of the RESTful APIs 57.

Operations of control designer 43 permit dragging and dropping of at least one of the data source objects into the same logical workspace as the control mapping, this dragging and dropping permitting operations with relation to control mapping as opposed to data flow mapping (907). Access to connection adapter database 609 is performed in order to perform the related operations of selecting connections to the one or more data source objects previously dragged and dropped in step 907, one of the connections being selected from one of the various saved connection adapters (step 912) of connection adapter database 609. Programming thereafter generates a source qualifier along with a default select query associated with the data source object which has been dropped into the logical workspace in conjunction with the control mapping being performed (steps 905, 906, and 907), and which operations may be repeated for one or more control names, control mappings, and associated plurality of data source objects to be mapped into or in conjunction with control mappings being generated.

Control mapping proceeds by developing and validating the control mapping (913) using different transformation objections like Joiner, Filter, control mapper, SQL control, control result sets, Lookup, Router, Cache, expression, and JAVA, Scala, Python, and R transformations. After validation of one or more control mappings, they are connected to corresponding control result sets (915), and the control mapping may thereafter be checked in so as to add suitable comments (916). Suitable programming may be selected through user input to execute the control mappings that have being generated in order to generate a log associated with the controls thereof (929, 931).

Certain advantageous programming of control designer 43, when executed, displays, in real-time, indicia which correspond to the execution of the control mappings. Still further, the programming is capable of maintaining control logic associated with the control mapping irrespective of substitution of one data source object for another. In one suitable implementation, this functionality is accomplished by means of a control mapper in the form of a bridge object, permitting the user to plug out or plug in data sources into the control mapping without changing actual logic, and thus helping the user build such mapping once and reuse it subsequently with other technical or data object changes which may occur, and without substantial rewrite.

The subroutines and other processing capabilities of control designer 43 permit the user to write controls and associated control mapping in multiple languages, with programming of control designer 43 generally permitting executions of controls written in such diverse languages without requiring rewrite. Upon successful execution of the controls (step 933), suitable programming is capable of notifying users of execution results through multiple available channels associated with the controls of system 23. Records associated with the controls are accessible to such controls in real-time, that is, with insignificant delay between the availability of such record at the source and the execution of the associated controls for such record. Still further advantageous programming permits for the deployment of mappings and controls developed by control designer 43, by readily exporting such results in any of a variety of user-selectable formats, such as Excel, CSV, PDF, or other image.

Figure 2:
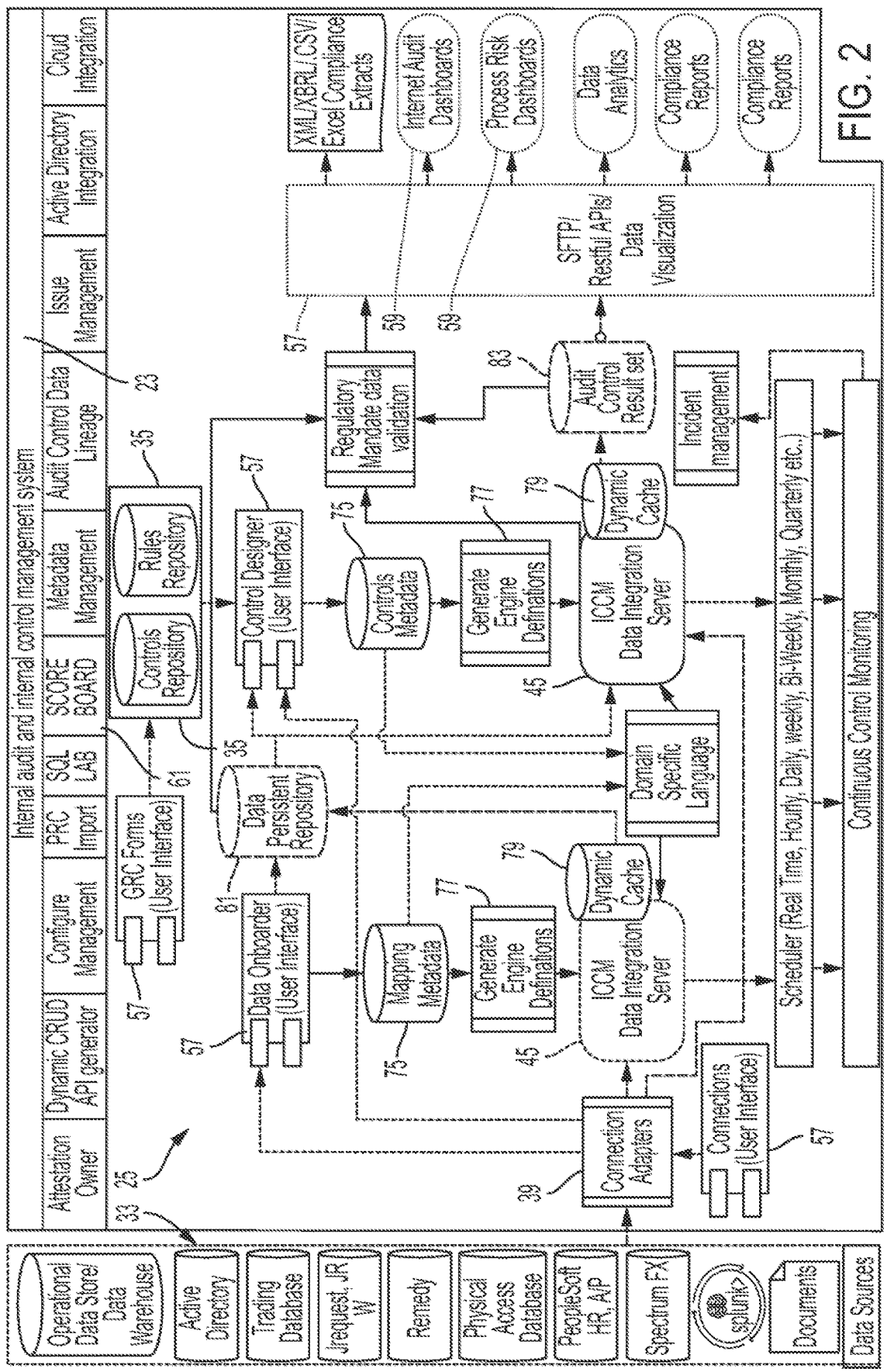
FIG. 2 is a high-level system architecture schematic of the various implementations of the computerized system of FIG. 1.
Figure 3:
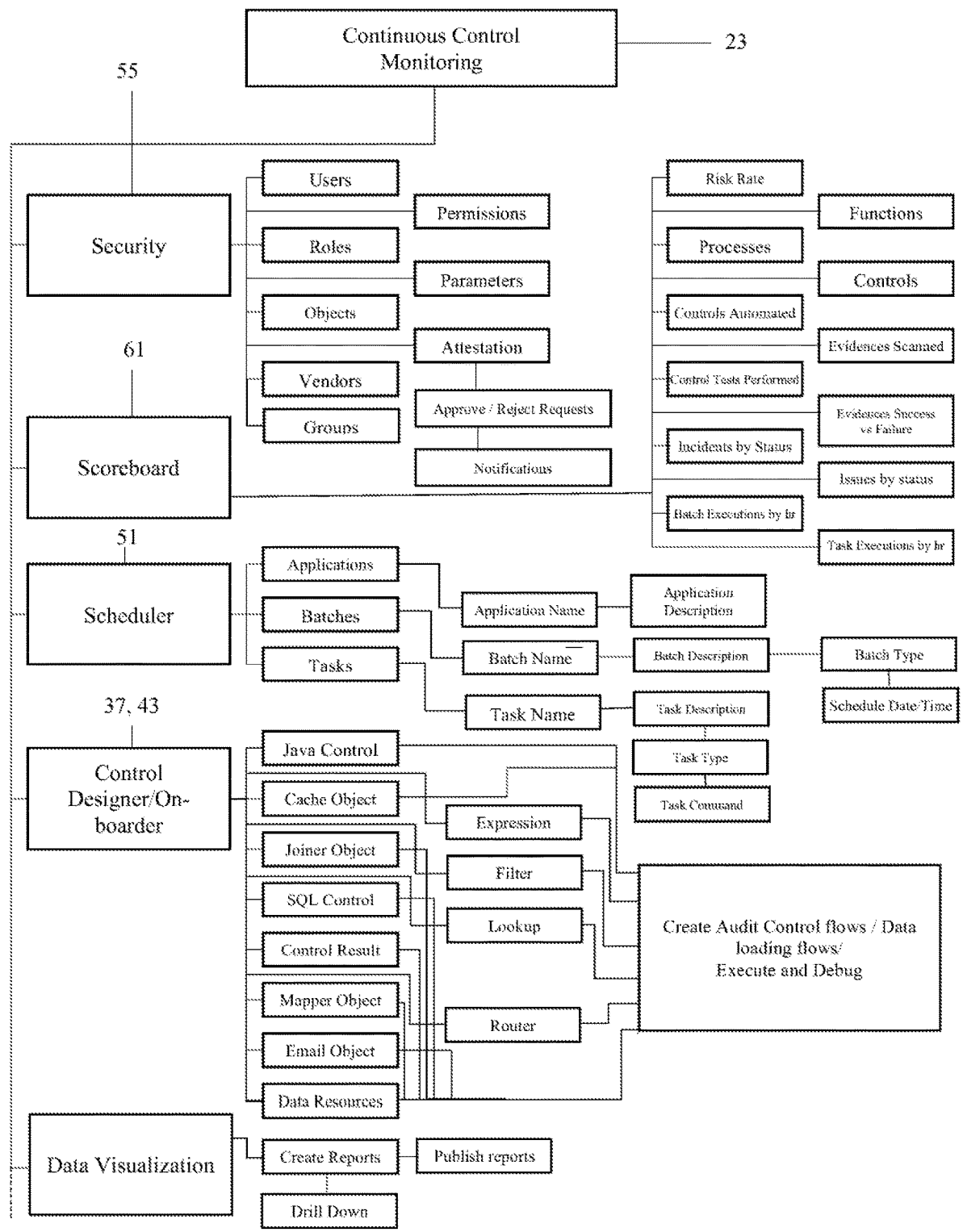
FIGS. 3 and 4 are schematic diagrams of further aspects of the systems of FIGS. 1 and 2, and showing system architecture for accomplishing continuous control monitoring.
Figure 4:
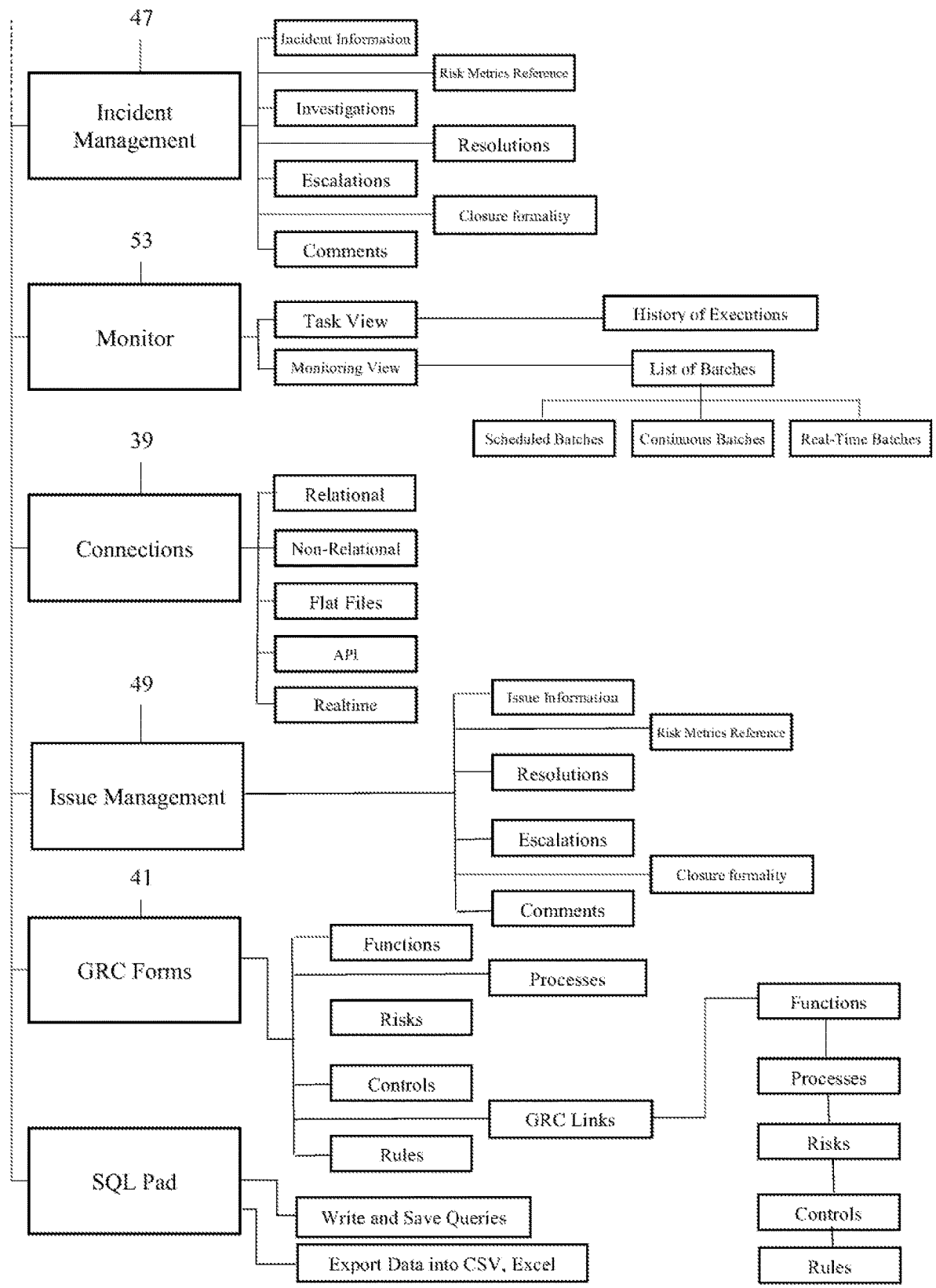

The programming associated with data on-boarder subsystem 37 and control designer subsystem 43, in certain implementations, may consist essentially of programming in a micro service architecture. Such programming likewise may generate dataflow mapping metadata and control mapping metadata, and storing such metadata in respective databases 75 (FIG. 2). In response to user-selected operations through RESTful API 57 associated with data on-boarder 37 and control designer 43, metadata may be accessed from databases 75, and suitable programming generates engine definitions associated with data mapping and control mapping, respectively (such engines referenced at 77 in FIG. 2). The metadata and associated engine definition may be further processed during the various functions of system 23 through data integration server 45, such operations facilitated by dynamic cache 79, which is operatively connected to repository 81 audit control result set 83, respectively.

The foregoing distributed memory architecture results in minimizing load on data sources connected to data on-boarder 37. Similarly, other tasks of data on-boarder 37, and especially those of control designer 43, including cleansing and transforming on-boarded data may generally be processed substantially more quickly than such tasks were performed on standard relational database management systems, because system 23 includes the repositories 35, 81, metadata 75, engines 77, dynamic caches 79, and integration server(s) 45 disclosed herein. Processing speeds with the disclosed architecture may occur at least fifty times faster for data on-boarding and control design using the architecture and associated programming of FIG. 2 disclosed herein. Computer programming associated with data on-boarder 37 improves system 23 operability by configuring data source objects into logical columns in associated data flow mappings and data records associated with the data source objects may be accessed through the logical columns, thereby establishing pipelined linkages between such columns, and at any respective points on the associated data flow mapping.

Figure 6:
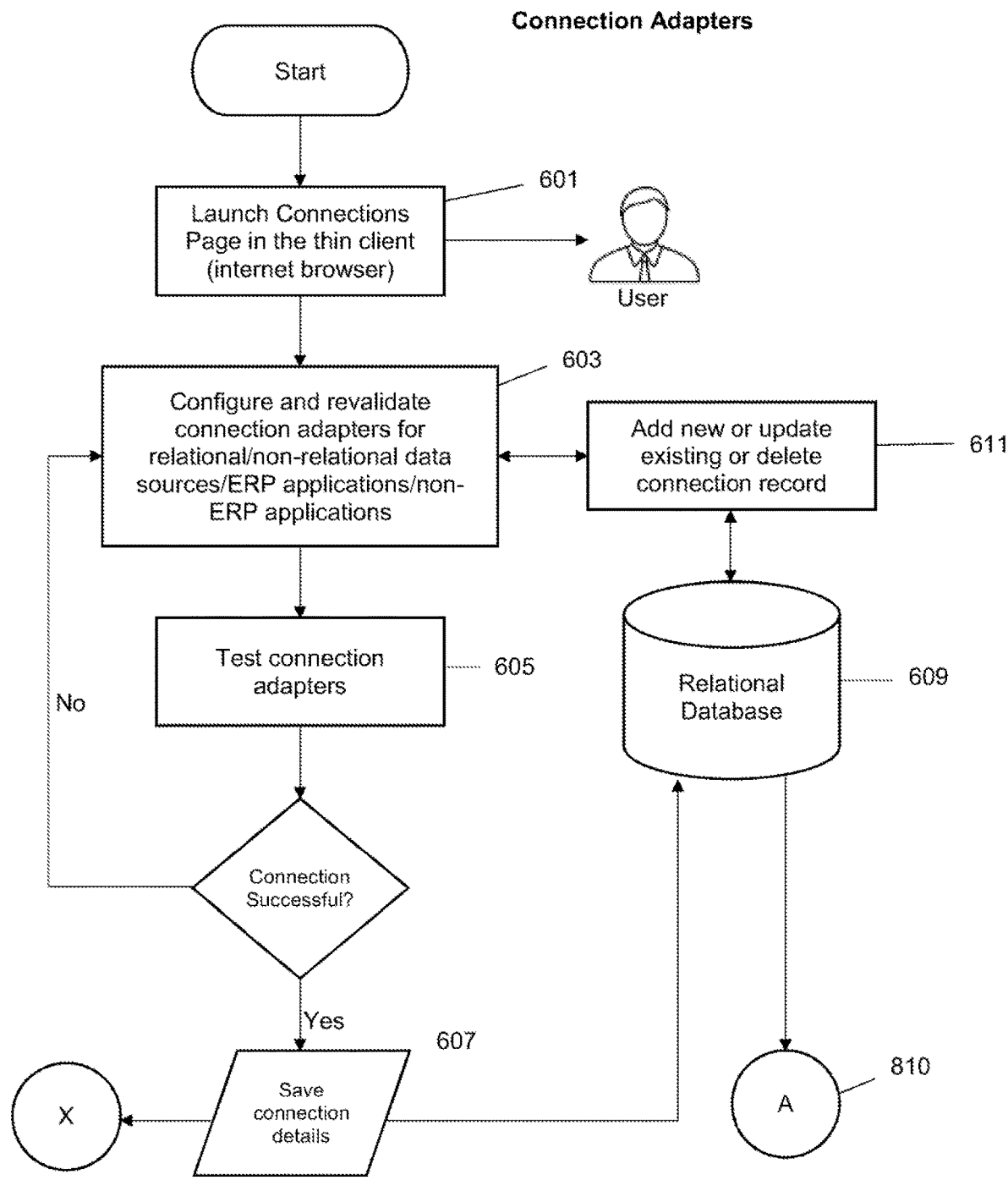
FIG. 6 is a flowchart showing another exemplary series of computer operations capable of being performed by associated programming of the system disclosed in FIGS. 1-4 herein, and related to management of connection adapters.
Figure 15:
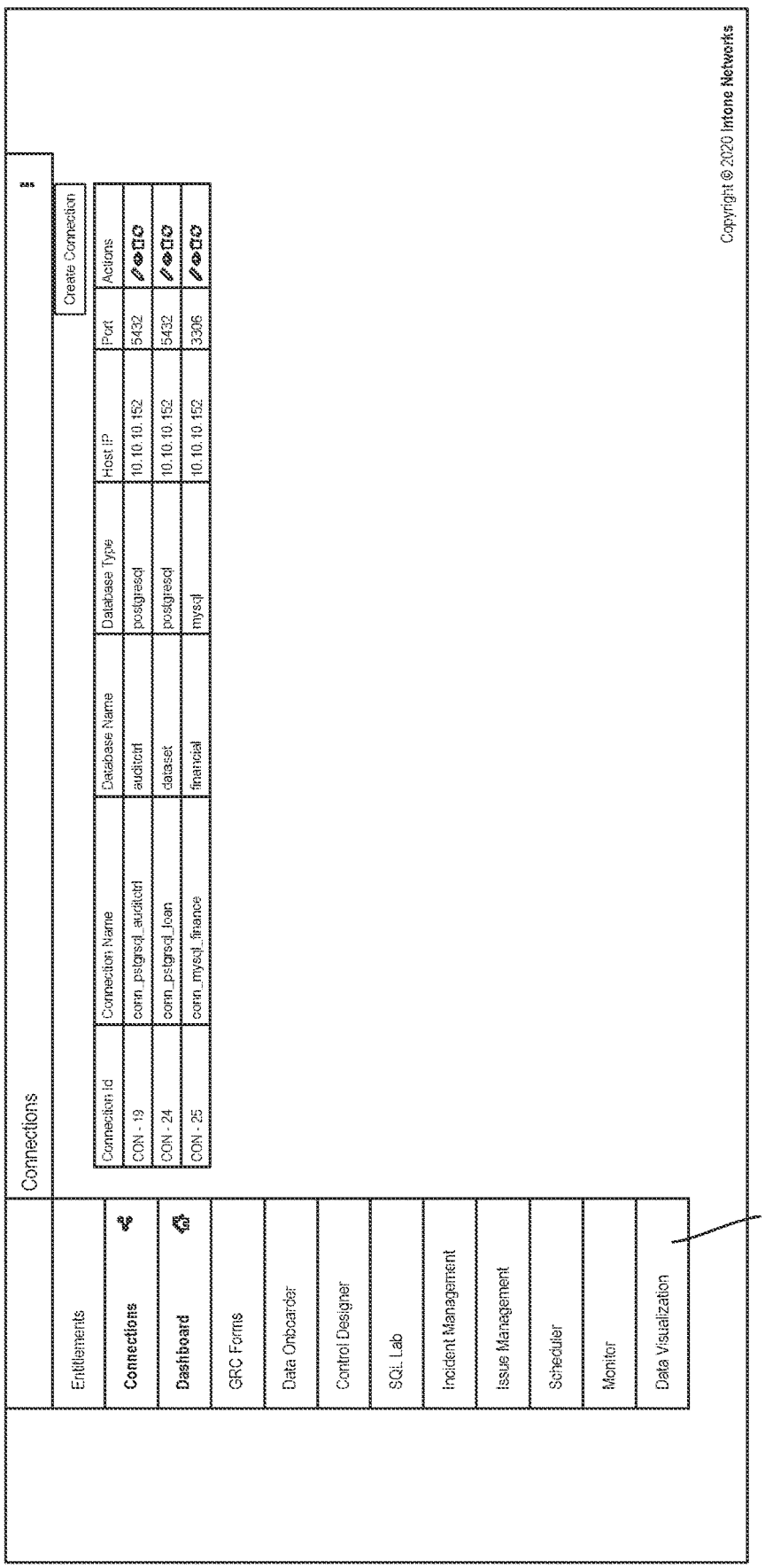
FIG. 15 is a screenshot of an exemplary possible implementation of a connections user interface according to this disclosure and associated with the connection adapter subsystem, one possible programming flowchart of which is shown in FIG. 6.

Connection adapters 39 may be developed, configured, and validated by exemplary programming, operation of which is shown in FIG. 6 and user selection of which may be accomplished through a single, user-perceptible display screen shown in FIG. 15. In response to user selection through the connections interface of FIG. 15, programming accesses data sources 33 to configure or revise and revalidate connection adapters (step 603) after launch of the connection adapter subsystem 39, such as through a suitable internet browser (601). As seen in FIG. 2, data sources 33 may include both relational and non-relational data sources, data related to ERP applications, data related to non-ERP applications, and data formatted in conformance with a plurality of industry standards. Suitable programming may test connection adapters (605) and save connection details (607) in associated connection adapter database 609 along with an associated connection record (611). Such created, edited, configured, or validated connection adapters are accessible by associated operations of data on-boarder 37 shown in FIG. 8 (step 810, FIGS. 6 and 8).

Figure 9:
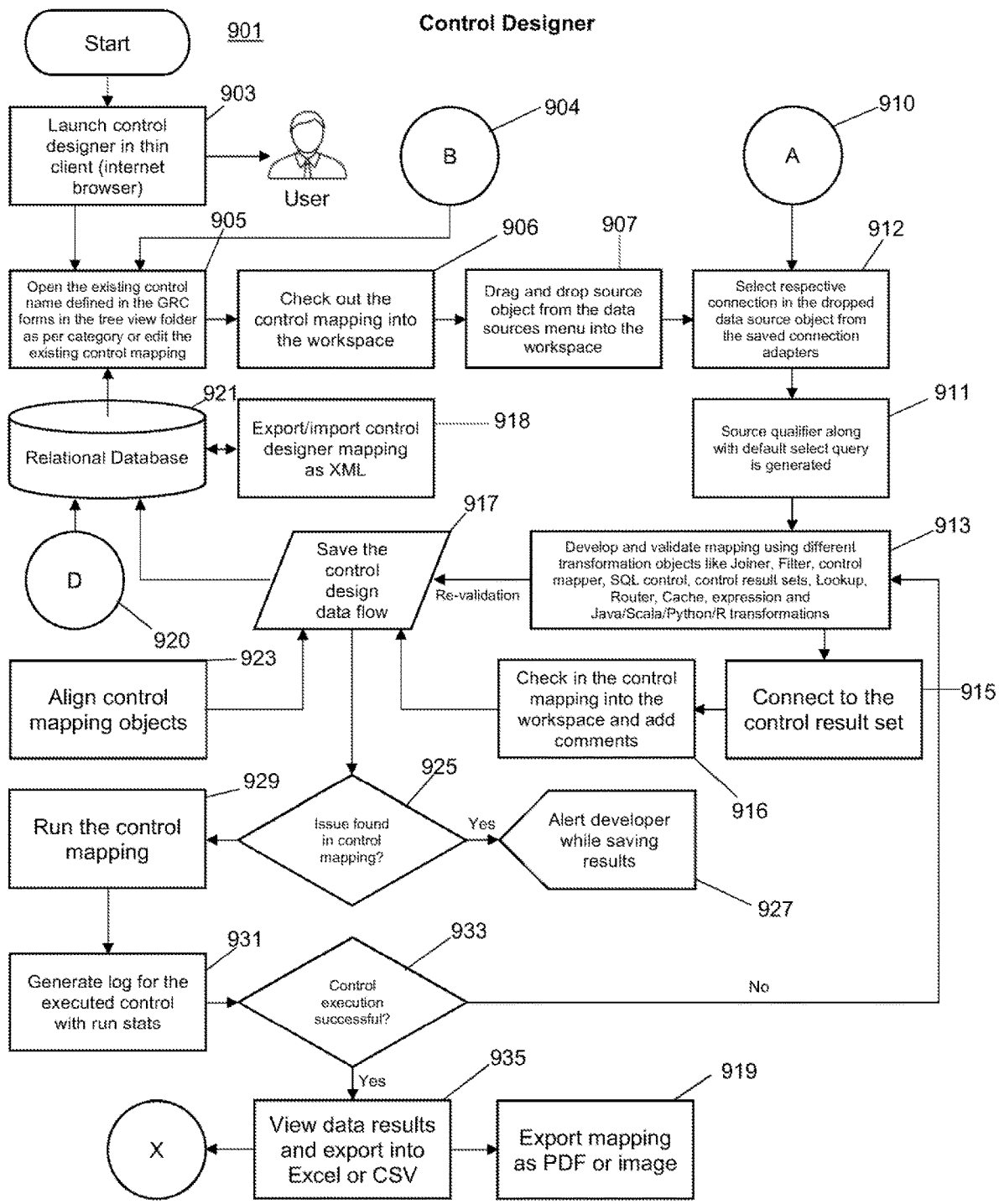
FIG. 9 is a flowchart showing various operations, as well as associated programming capable of performing such operations, and associated with a control designer subsystem of the computerized systems of FIGS. 1-4.
Figure 18:
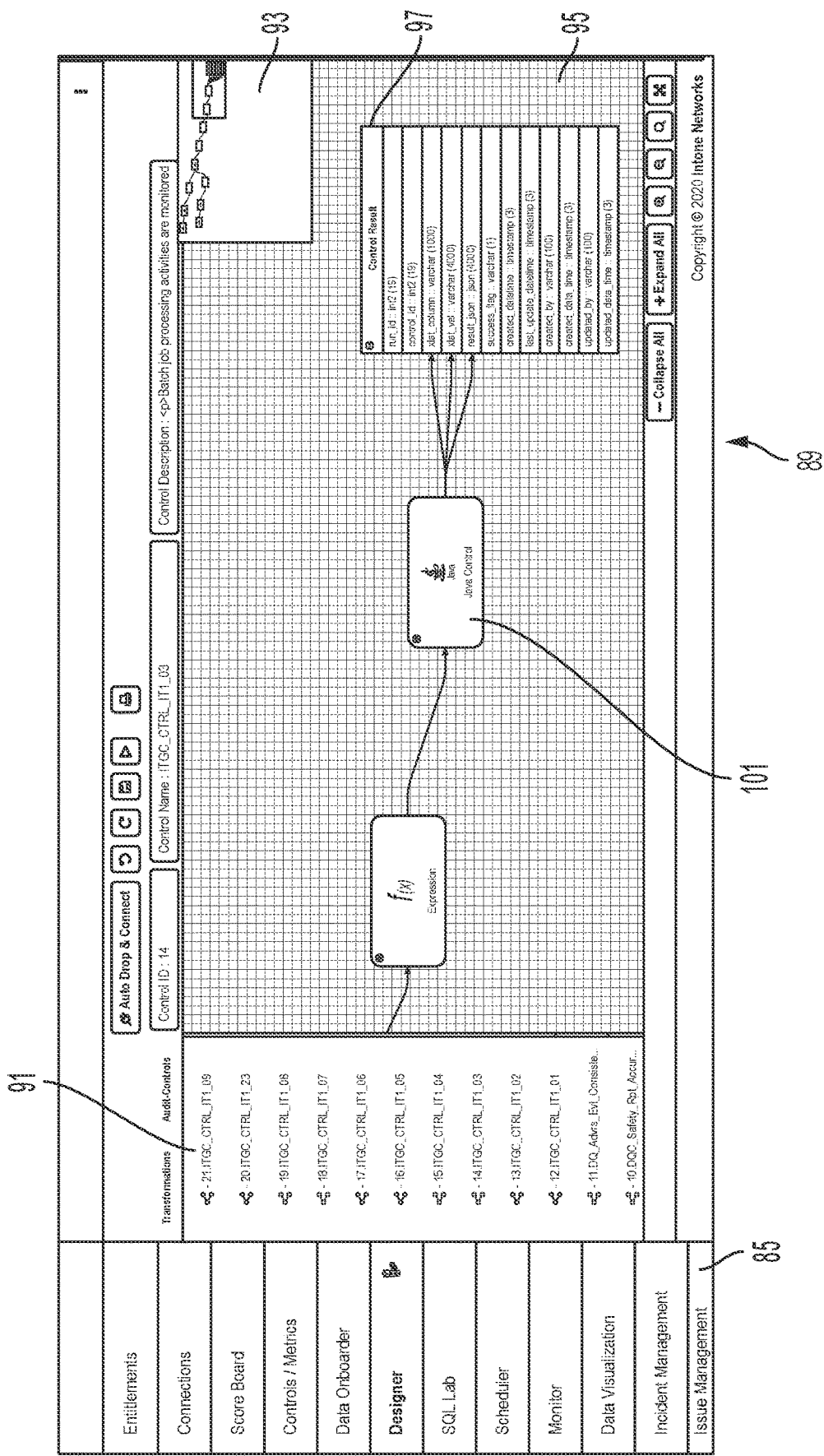
FIGS. 18, 19, and 20 are screenshots of a user-perceptible graphical user interface in certain possible implementations of the control designer subsystem of the system herein, such designer subsystem associated with operations set out in FIG. 9 hereto.
Figure 19:
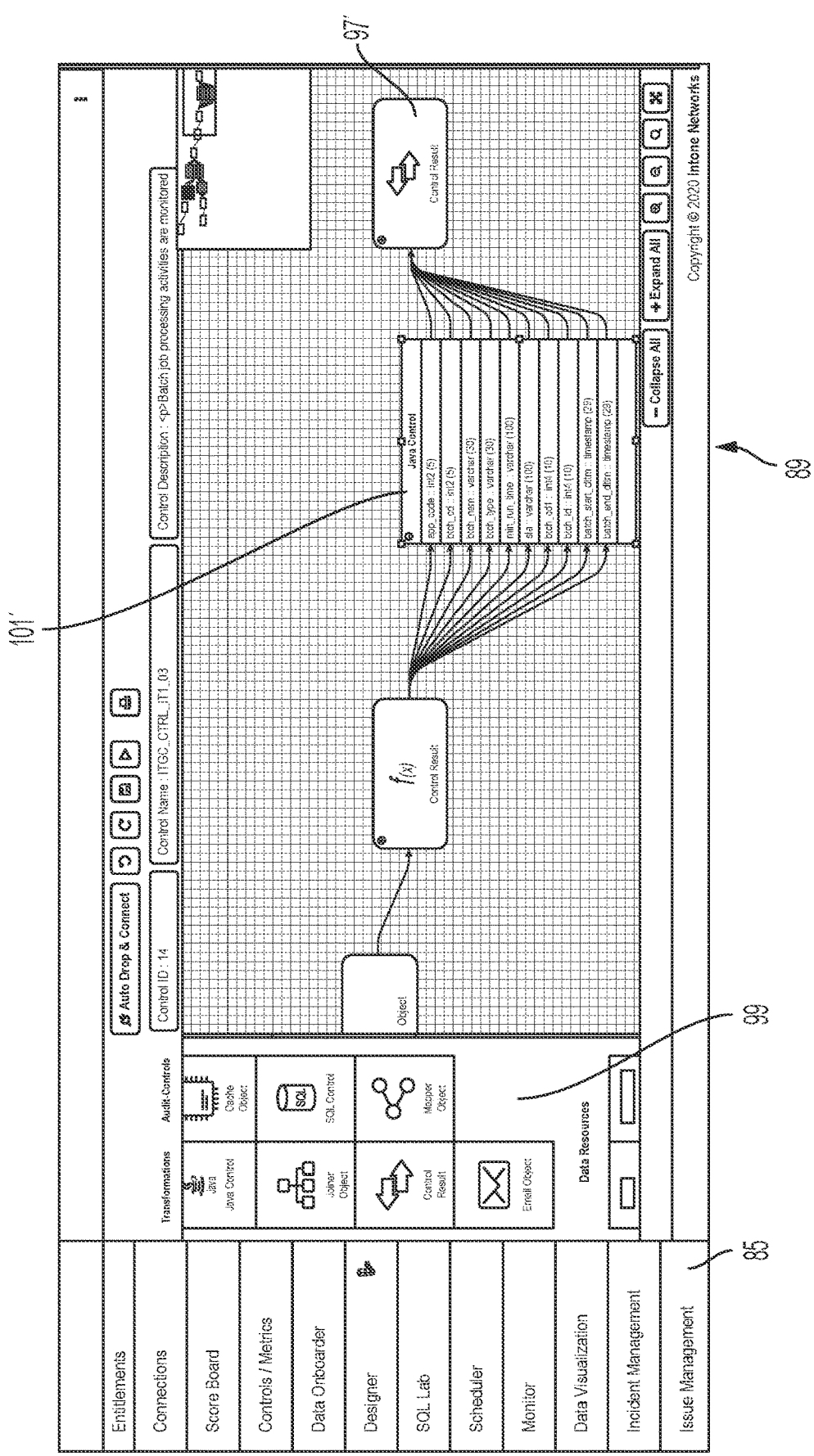
Figure 20:
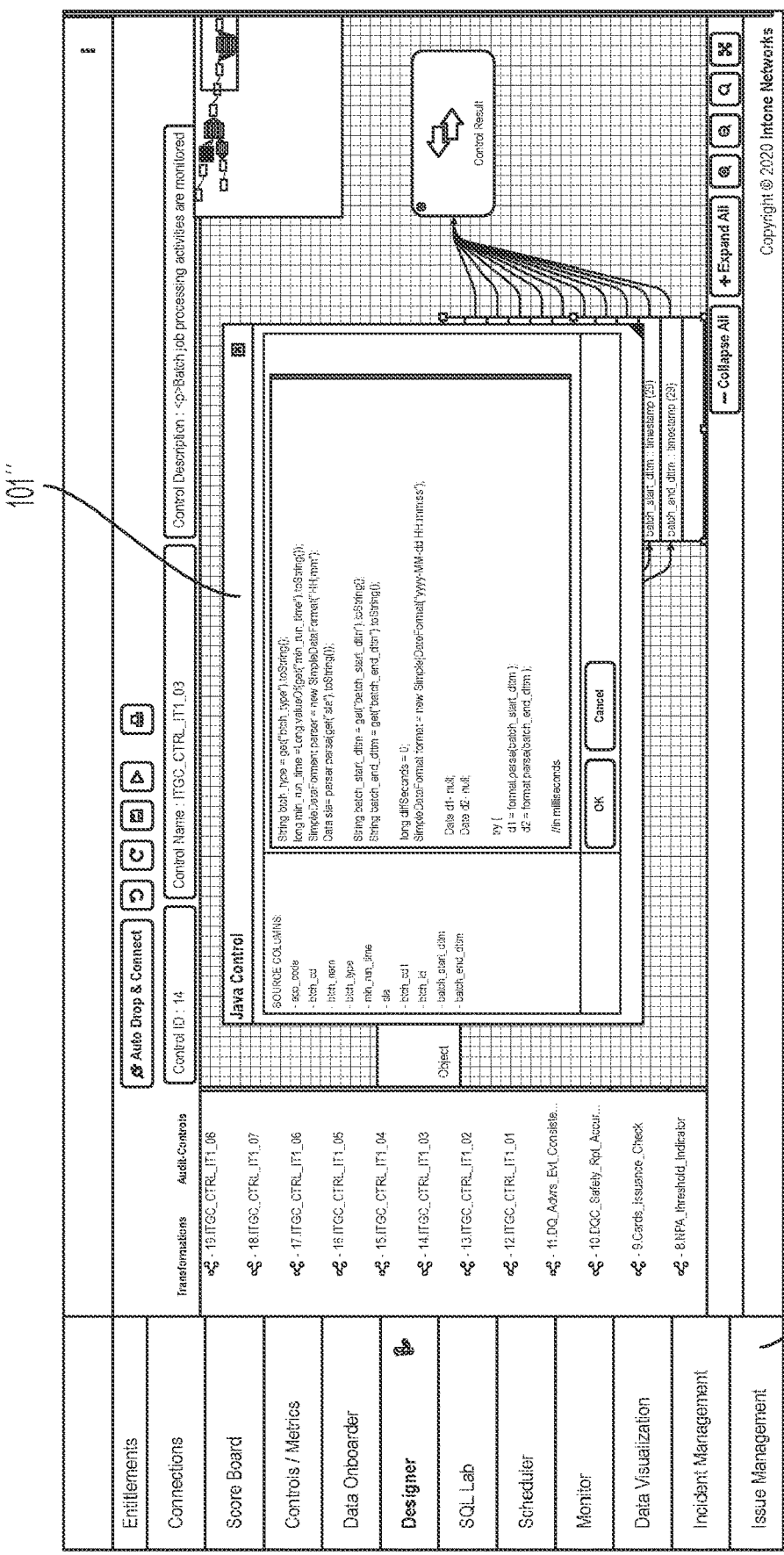

The exemplary programming operations of control designer of system 43 shown in FIG. 9 are further illustrated with respect to the associated user-perceptible screen of the control designer interface 89 shown in FIGS. 18-20. Thus, for example, operations associated with computer programming steps 904, 905, 906, 907, 910, and 912 are associated with user-selectable and/or user-perceptible fields shown in the screenshots of interface 89. Control names 91 are user-selectable on a left side scrollable menu and associated control mapping 93 is visible in a window in the upper right corner. The associated logical workspace 95 contains data objects which have been dragged and dropped therein.

FIG. 18 shows user selection of a control result control name, which has been expanded to include details thereof at 97 (with the unselected form of control result shown in FIG. 19 in a corresponding location on the right side of the screen). Referring to FIG. 19, data objects may be selected from a suitable data resources menu 99 and used to edit or perform other operations related to the control mapping 93 in logical workspace 95. The control labeled "JAVA control" 101 is likewise selectable in FIG. 18 to reveal its contents in FIG. 19 as 101'. The power and improved usability of the interface associated with control designer 43 is further illustrated by the fact that the expanded JAVA control 101' may be further selected to reveal still further programming details associated with the items comprising JAVA control, as illustrated by the further expansion shown at FIG. 20 appearing as a window 101".

Figure 7:
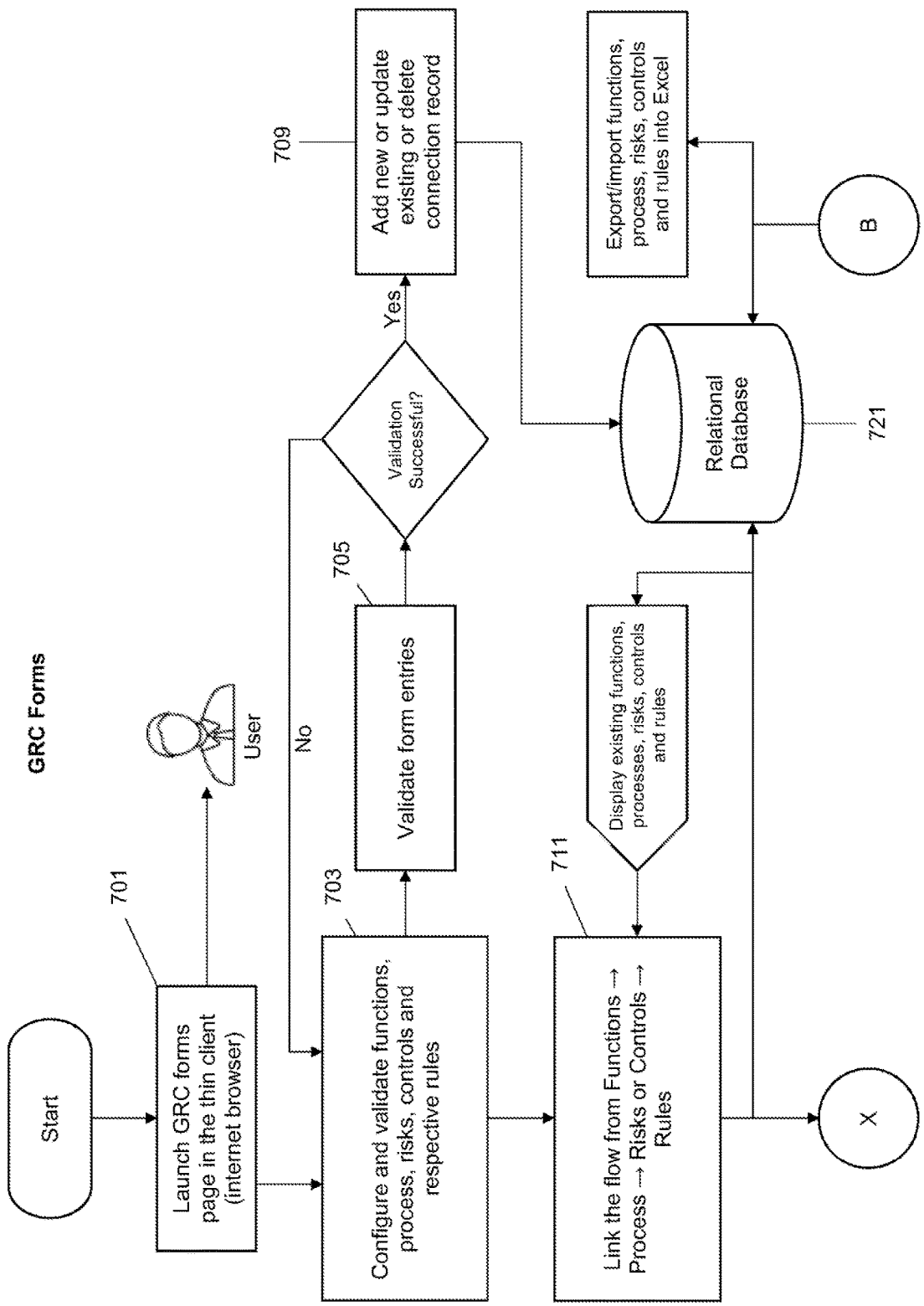
FIG. 7 is a flowchart showing another exemplary series of computer operations performed by associated programming of the systems of FIGS. 1-4, related to the management of GRC forms.

Control designer subsystem 43 is linked by suitable programming to GRC forms subsystem 41. In particular, control names operated on by control designer 43 are defined in and by operations of GRC forms subsystem 41, exemplary operations of such GRC forms subsystem 41 being shown and described with reference to FIG. 7. In the illustrated implementation, the GRC forms user interface is launched, such as through a thin client (701), data corresponding to various controls and rules may be selected with access from the corresponding controls and rules repositories 35 (FIG. 2), in order to structure discrete ones of the rules into a corresponding entry into a GRC form. Entries into the GRC forms may relate to functions, processes, risks, controls, and associated rules, any and all the foregoing being configured as part of the operation of the GRC forms subsystem (703). After such configuration of GRC forms, the form entries are validated (705), and upon successful validation, a new or updated one of the connection adapters for use by connection adapter subsystem 39 is stored in database 721 (step 709). GRC forms are likewise linked to associated rules of rules repository 35 (FIG. 2) (step 711).

Figure 10:
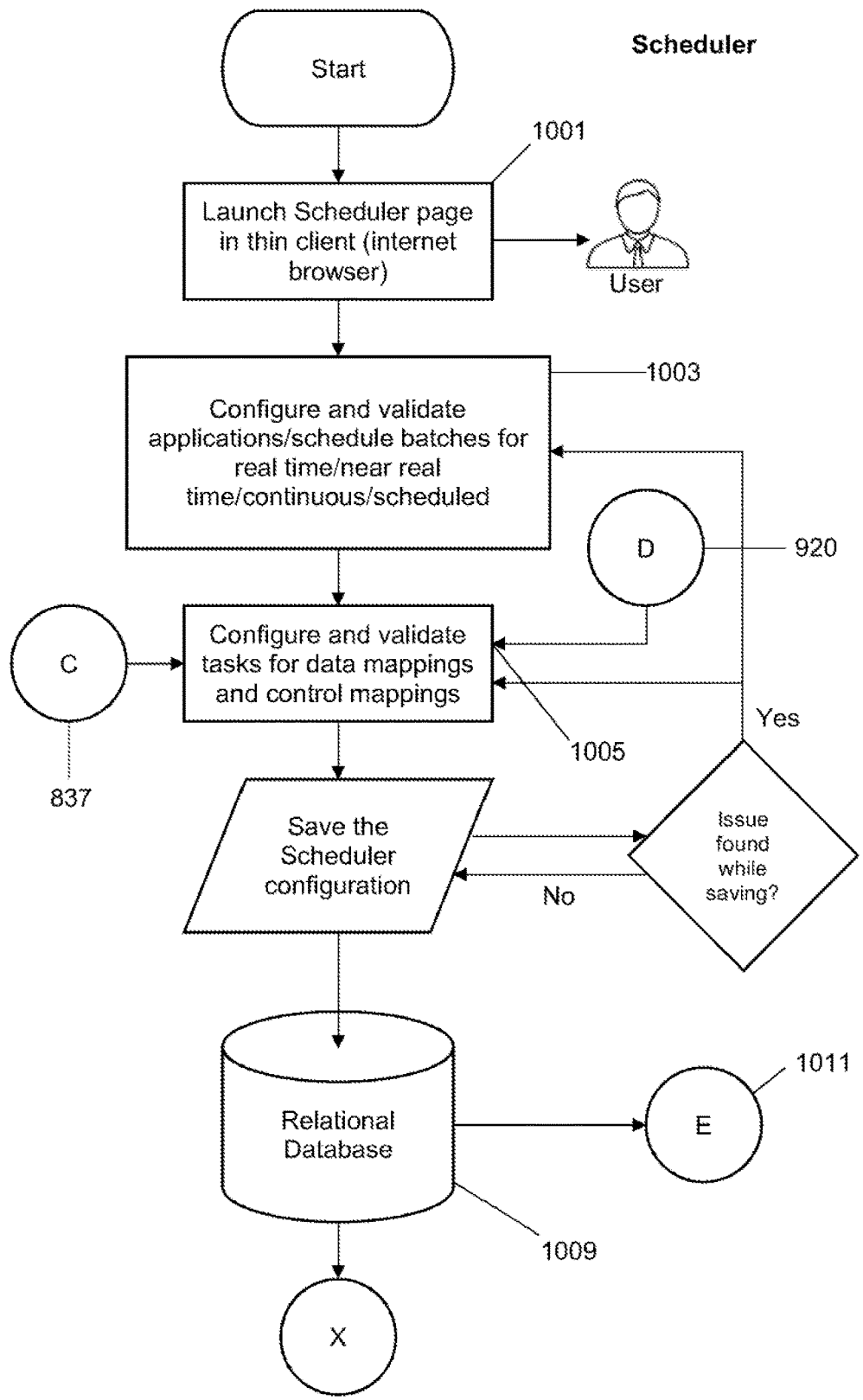
FIG. 10 is a flowchart of computer operations, as well as programming associated therewith capable of performing such operations, and related to a scheduler subsystem of the computerized system of FIGS. 1-4.
Figure 17:
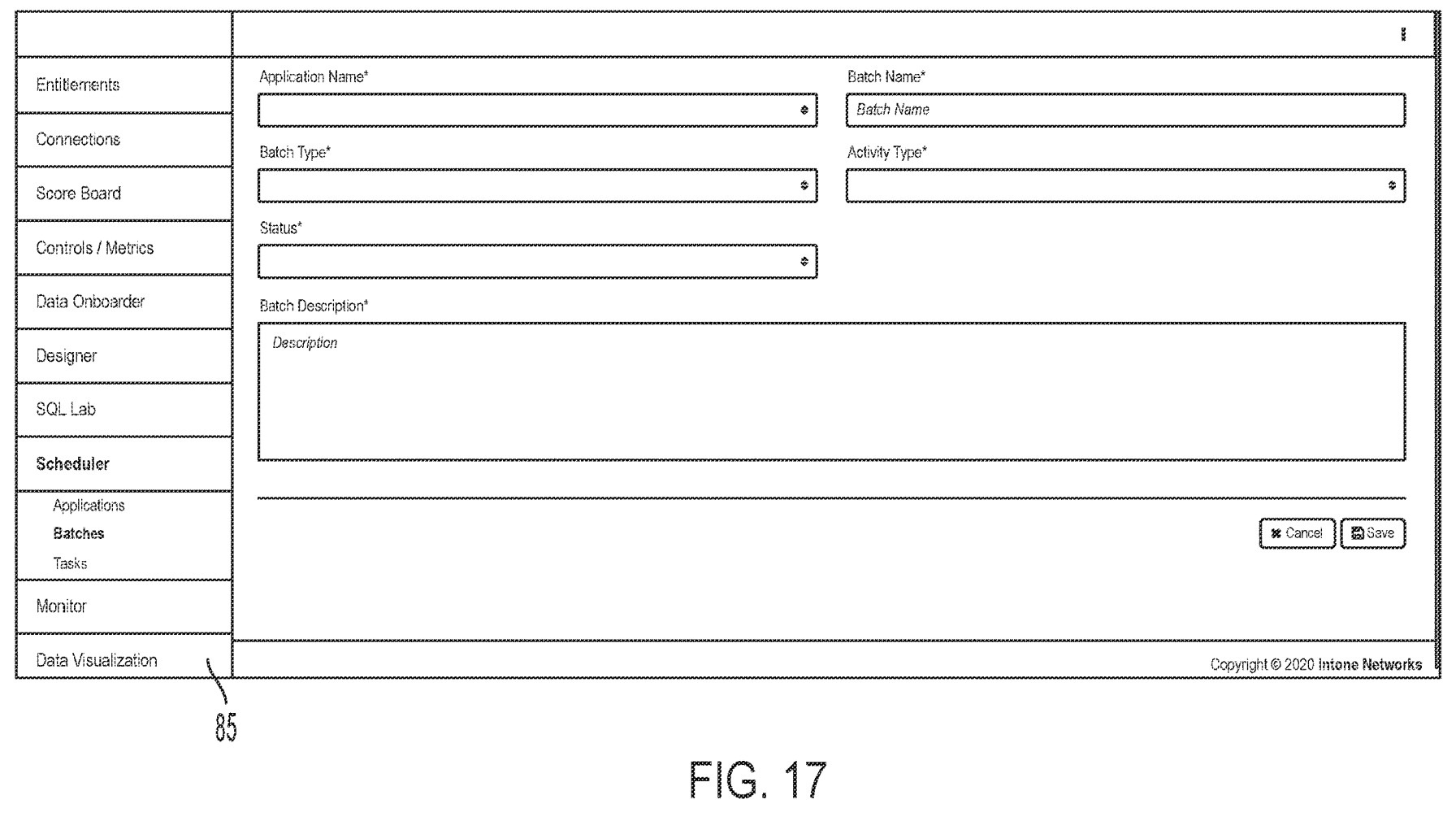

Referring now to FIG. 10, exemplary operations of scheduling subsystem 51 are shown, along with associated computer programming. The scheduling subsystem 51 may be launched through a thin client, such as an internet browser (1001), one example of the associated interface being shown in FIG. 17. Applications, batches, and tasks may be selected through the user-perceptible display screen as shown in FIG. 17 (step 103, FIG. 10) and the associated actions, which have been scheduled, may be configured and validated in relation to data mappings and control mappings (1005). Such computerized configuration and validation occur by selective access to metadata or other data stored in databases associated with data on-boarder 37 and control designer 43, respectively (steps 837 and 920 (FIG. 10)). The resulting scheduling configuration is thereafter saved (1007) to in an associated relational database 1009. Results of scheduling may be displayed and updated, such as in real time, in the user interface shown in FIG. 17. The schedule configuration stored in relational database 1009 is selectively accessed by monitoring and incident management subsystems 53, 47 (step 1011).

Figure 11:
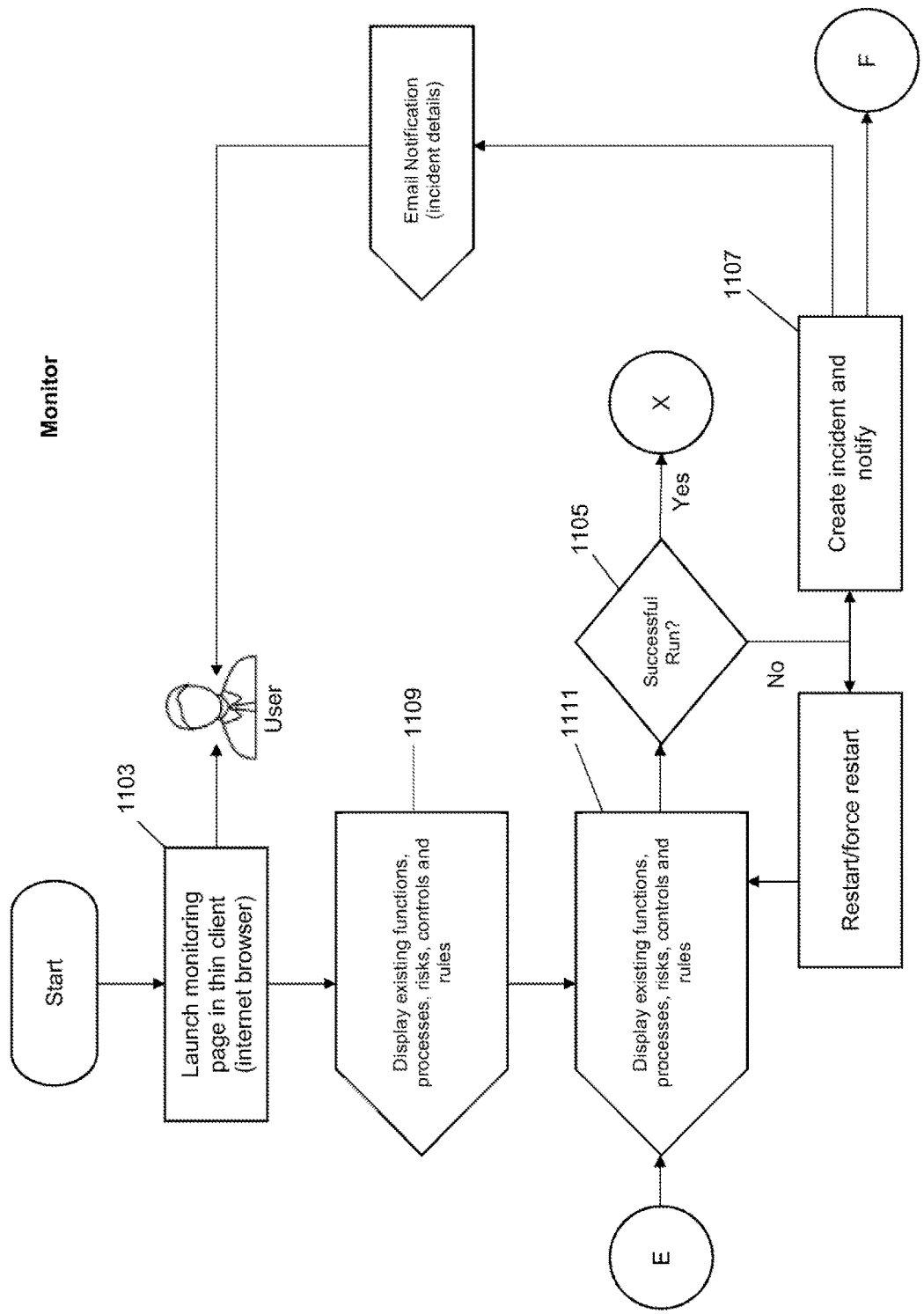
FIG. 11 is a flowchart of certain computer operations, as well as associated programming capable of performing such operations, and related to a monitoring subsystem associated with the system of the FIGS. 1-4.
Figure 14:
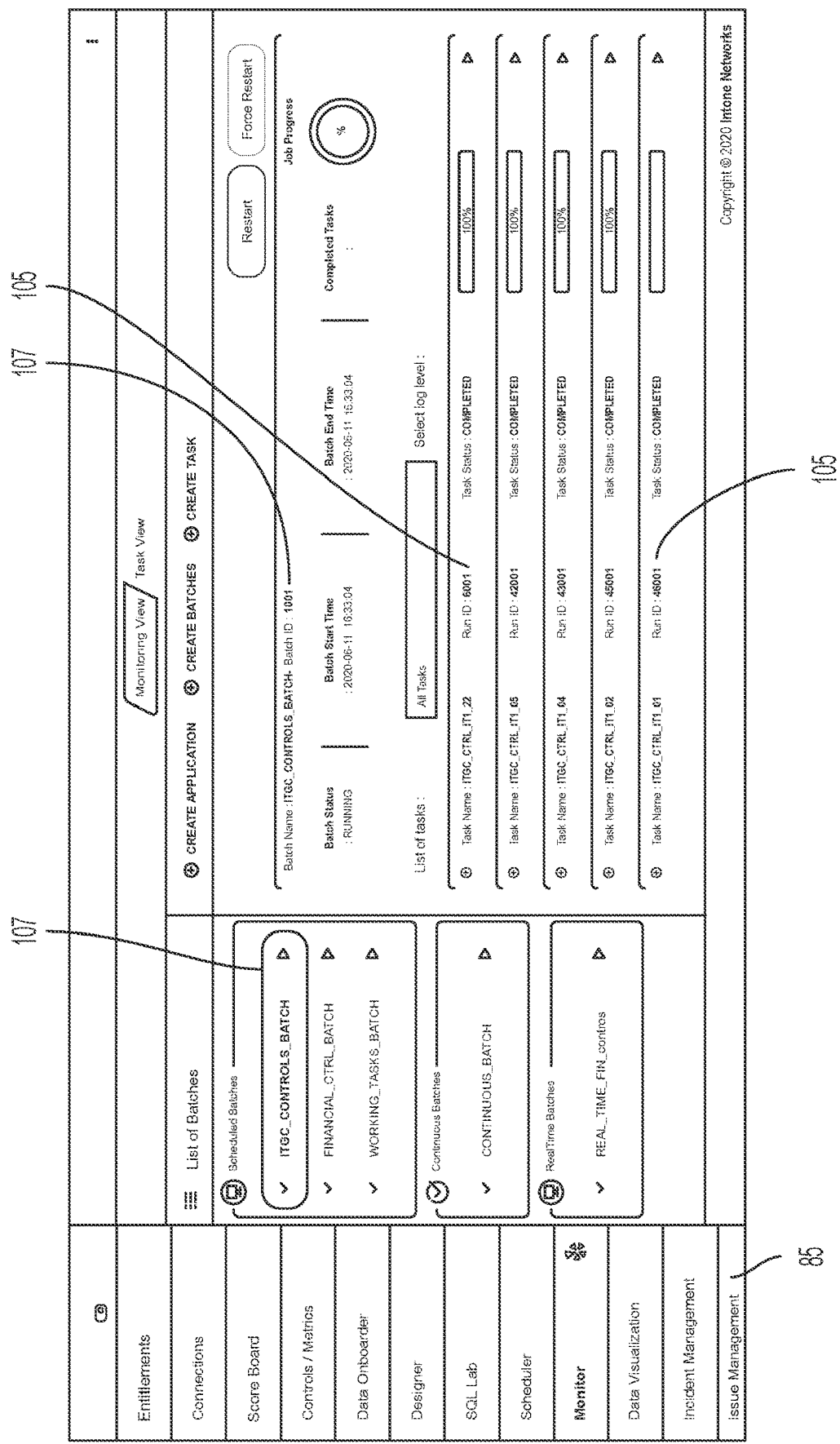
FIG. 14 is a screenshot of another possible implementation of a dashboard and associated user-perceptible screen, displaying indicia of monitoring subsystem operations shown in flowchart form in FIG. 11.

Monitoring subsystem 53 and an exemplary series of computer implemented operations thereof is shown by way of its associated web-browser graphical user interface in FIG. 14, and the flowchart of FIG. 11. The interface shown in FIG. 14 is launched by suitable user selection of associated fields (1103), in response to which existing functions, processes, risks, controls, and rules are shown as user-selectable indicia 105, in this implementation displayed in a monitoring view associated with the illustrated screen shown in FIG. 14 of the monitoring subsystem user interface. The controls being executed by system 23 are continuously monitored in real time through such single, user-perceptible screen. As such, suitable programming may identify a failure in real time during execution of a control related task (1105) and thereafter generate an incident report accessible by incident management subsystem 47 (1107). Upon resolution of the incident, programming causes a restart of the control related task, preferably at an audit control point associated with the failure. Programming of monitoring subsystem 53 is thus capable of identifying scheduled, continuous, and real-time batches, tasks, and a history of task executions associated with control mappings (1109, 1111) and necessarily updates the indicia in real-time, such as indicia 107. Through the interface shown in FIG. 14, task details may be retrieved by selecting user-selectable fields 105. In this manner, controls are continuously monitored by monitoring subsystem 53 and its associated programming.

Figure 12:
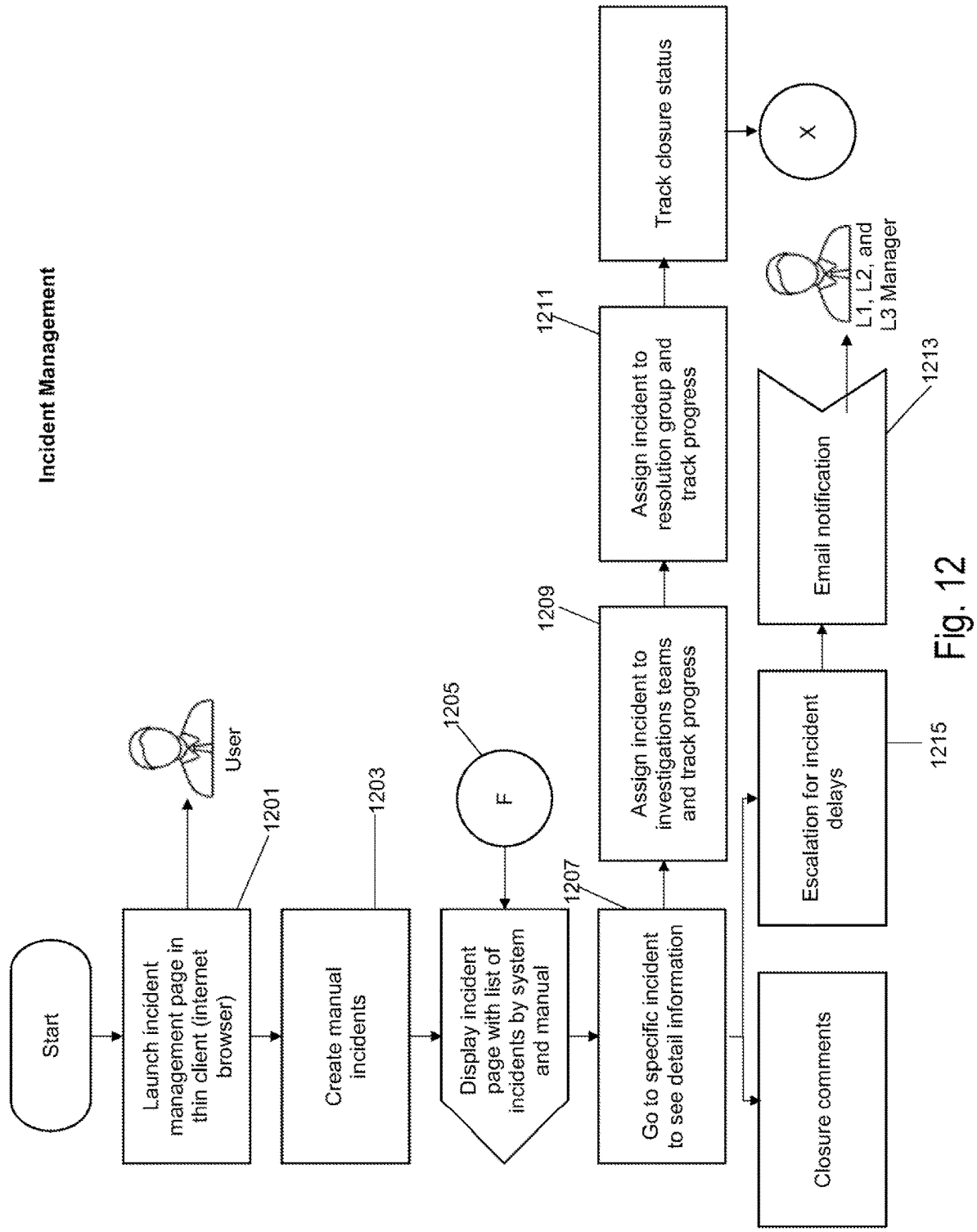
FIG. 12 is a flowchart showing certain operations, as well as associated programming capable of performing such computer operations, and related to an incident management subsystem of the systems of FIGS. 1-4.
Figure 16:
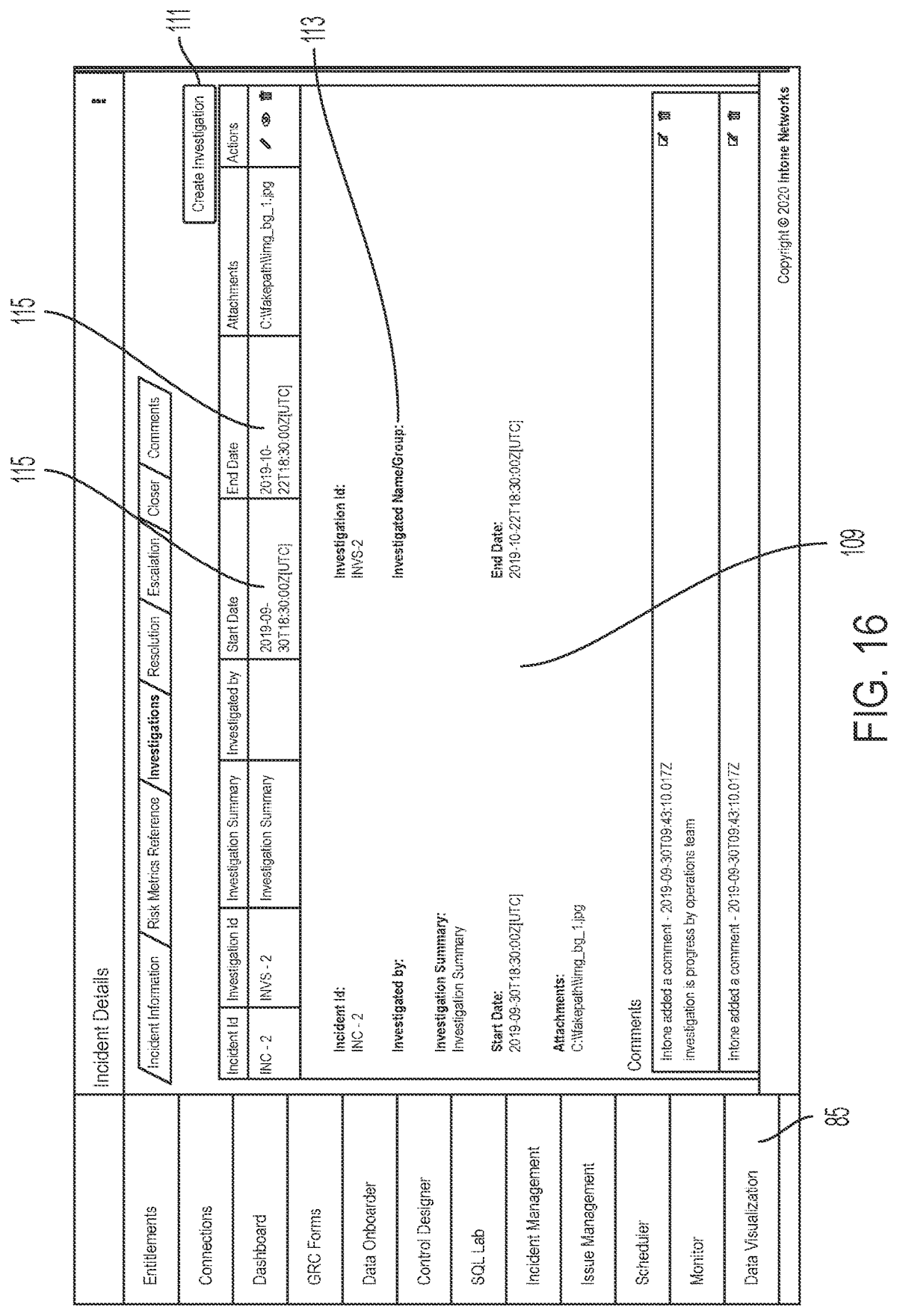

Incident management subsystem 47 permits management not only of manually entered incidents, but also of incidents generated by system tests and system operations described previously and related to the other subsystems of system 23. One exemplary series of computer operations and associated programming of incident management subsystem 47 is shown in FIG. 12, and one exemplary user-perceptible screen of a user interface is shown in FIG. 16. As with previous subsystems discussed herein, launching of the incident management subsystem 47 is preferably accomplished through user selection of the appropriate file from the simultaneously displayed user-selectable fields for all subsystems (1201). In this implementation, the selection is facilitated by the user-selectable menu of all subsystems shown on the left side of the user-perceptible screen. After creation of any manual incidents and input thereof into the system (1203), a list of incidents logged by computerized operations of monitoring subsystem 53 may be accessed (step 1205). Linkages to the associated data logged by monitoring subsystem 53 may be accessed and displayed as indicia 109 (1207). The user interface likewise has selectable fields for assigning the incident to investigation teams as a part of an investigation, such as user-selectable field 111 (step 1209), and such assignment may likewise assign a resolution group (step 1211), which may be entered and later reviewed in user-modifiable indicia 113. Progress can be tracked by either user entry or access to data on the system corresponding to the start date of the associated incident investigation. Data incident files may be associated with the investigation and the system may include programming to track open or closed status of investigations (1213). Suitable indicia 115 may be displayed corresponding to operations of incident management subsystem 47, such as the incident or investigation start and end dates and status of the investigations.

The incident management subsystem 47 may likewise generate email notifications or other notices to personnel (steps 1213, 1215), with programming factoring in the passage of time from the inputted start date to the current date associated with the incident under management by incident management system 47.

Referring generally to FIGS. 13-20, programming subsystems for all of the environments, that is, development environment 27, run-time environment 29, and management environment 31, are user accessible through a thin client, such as an internet browser, screenshots of associated graphical user interfaces of which are shown in such figures. User-selectable fields which permit launching of the subsystems disclosed herein of all three environments are simultaneously displayed on the user-perceptible screens, in this case such simultaneous display being in the form of a sidebar 85 comprised of user-selectable fields for the various subsystems available in system 23.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Although several embodiments of inventive concepts have been disclosed in the foregoing specification, it is understood that many modifications and other embodiments of inventive concepts will come to mind to which inventive concepts pertain, having the benefit of teachings presented in the foregoing description and associated drawings. It is thus understood that inventive concepts are not limited to the specific embodiments disclosed hereinabove, and that many modifications and other embodiments are intended to be included within the scope of the appended claims. It is further envisioned that features from one embodiment may be combined or used with the features from a different embodiment(s) described herein. Moreover, although specific terms are employed herein, as well as in the claims which follow, they are used only in a generic and descriptive sense, and not for the purposes of limiting the described inventive concepts, nor the claims which follow.

What is claimed is:

1. A computer system for internal audit and internal control management, the system comprising:
 a platform for integrated internal audit and internal control management, the platform comprising a development environment, a run-time environment, and a management environment;
 a plurality of data sources stored in databases and related to auditable processes subject to the internal audit;
 a plurality of repositories storing data associated with controls and rules related to the control management;
 a plurality of interconnected computer subsystems having programming routines executable in at least one of the environments, the computer subsystems comprising first, second, and third sets of subsystems;
 wherein each of said subsystems for all of said environments are user-accessible through a thin client comprising an internet browser, the thin client having a graphical user interface with selectable fields corresponding to each of said subsystems of each of said three environments simultaneously displayed on an associated user-perceptible screen;
 wherein the first set of subsystems is executable in the development environment, the first set of subsystems comprising a data on-boarder, connection adapters, GRC forms, and a control designer;
 wherein the second set of subsystems is executable in the run-time environment and comprises a data integration server;
 wherein the third set of subsystems is executable in the management environment and comprises incident management, issue management, scheduling, monitoring, and security;
 a RESTful application programming interface generated by, and having user-selectable fields associated with, the first set of subsystems in the development environment;
 a plurality of dashboards generated by, and having user-selectable fields associated with, the third set of subsystems in the management environment;
 wherein the dashboards comprise a control monitoring scoreboard, the scoreboard simultaneously displaying key performance indicators determined in real time by the third set of subsystems of the management environment, the key performance indicators comprising controls failed, related records scanned, tests performed, and associated risk scores, the foregoing determinations displayed on the scoreboard as user-perceptible indicia;
 the scoreboard having programming for displaying detail records of respective ones of the key performance indicators in response to user selection of an associated field on the scoreboard;
 wherein the data on-boarder comprises programming capable of performing the following computer-implemented steps in response to user input through the RESTful application programming interface:
  create a first data flow mapping corresponding to a first data source object to be on-boarded;
  edit a second data flow mapping previously created by the data on-boarder, the second data flow mapping corresponding to a second data source object;
  drag and drop at least one of the data source objects to be on-boarded into a first logical work space accessible from the RESTful application programming interface;
  select a predetermined connection for the dropped source object from a plurality of the connections determined by the connection adapters;
  generate a source qualifier and default select query for the dropped source object;
  develop and validate the data flow mappings using transformation objects selected from the group consisting of Joiner, Filter, Lookup, Router, Cache, Expression, and JAVA/Scala/Python/R transformations;
  connect to target definitions after validation of the data flow mappings;
  execute the data flow mappings to generate associated run statistics, and
  display in real-time first indicia corresponding to the execution of the data flow mappings;
 wherein the steps of dragging and dropping and connecting to the target definitions are executable in a manner agnostic to script language associated with the source object and the target definition;
 wherein the control designer subsystem of the first set of subsystems comprises programming capable of performing the following computer-implemented steps, in response to user-input:
  access one of the databases to retrieve an existing control name having a first control mapping associated therewith and defined in the GRC forms in a tree view folder associated with a control category;
  edit a second control mapping previously designed by the control designer subsystem;
  transfer at least one of the control mappings to a second logical workspace accessible from the RESTful application programming interface;
  drag and drop at least one of the data source objects into the second logical workspace;
  develop and validate the control mapping using transformation objects selected from the group consisting of control mapper, SQL control, and control result sets;
  connect to a control result set after validation of at least one of the control mappings;
  execute the control mappings to generate a log associated with the controls of the executed control mappings;
  display in real-time second indicia corresponding to the execution of the control mappings;
 wherein the control mapper comprises programming capable of maintaining control logic associated with the corresponding one of the control mappings, irrespective of substitution of one of the data source objects of the corresponding control mapping with another one of the data source objects retrieved from the databases.

2. The system of claim 1, wherein the data on-boarder subsystem and the control designer subsystem consist essentially of programming in a micro service architecture.

3. The system of claim 1, wherein the control monitoring scoreboard comprises programming for displaying on a single, user-perceptible display screen indicia corresponding to performance of the controls being monitored by the system, the performance quantified by numbers determined for predetermined, corresponding periods of time, the displayed indicia corresponding to data determined by the control monitor and comprising functions, processes, risks, controls, completed and failed monitoring, incidents by status, batches executed by status, tasks executed by status, and issues by status.

4. The system of claim 1, wherein the data on-boarder comprises programming, which, when executed, configures the data source objects into logical columns in the data flow mapping, the programming displaying indicia corresponding to the logical columns in the RESTful API, and further including programming to access data records associated with the data source objects corresponding to the logical columns through pipelined linkages.

5. The system of claim 1, wherein the connection adaptors comprise:
   a connections interface;
   programming executable in response to user selection through the connections interface and capable of performing, when executed, the steps of:
      access the data sources, wherein the data sources are heterogeneous and comprise relational data sources, non-relational data sources, data related to ERP applications, data related to non-ERP applications, discrete ones of the data sources formatted in conformance with respective industry standards;
   wherein the step of drag and drop of the data source object is performed by programming to receive any of the data source objects from the heterogeneous data sources, irrespective of the respective industry standards to which the data source object conforms and to place the data source objects into the first logical work space by means of one of the connection adaptors corresponding to a respective one of the heterogeneous data sources.

6. The system of claim 1, wherein the scheduling subsystem comprises programming, when executed by the user, capable of performing the following steps:
   through a single user-perceptible display screen, enabling selection and scheduling of applications, batches, and tasks, the programming permitting scheduling in real time, the programming being capable of scheduling applications, batches, and tasks in any of the time intervals comprising continuous, intermittent, and one-time;
   the programming determining the results of the scheduling and displaying and updating indicia corresponding to the results of the scheduling.

7. The system of claim 1, wherein the data on-boarder and the control designer have programming capable of generating data flow mapping metadata and control mapping metadata, respectively, the programming storing the metadata in one of the databases accessible to the data integration server, the programming generating each of the data flow mappings and the control mappings in response to receiving user-input in a single, domain-specific programming language selected from the group consisting of JAVA, Python, and Scala.

8. The system of claim 1, wherein the monitoring system comprises monitoring programming to continuously monitor the controls in real-time through a single, user-perceptible monitor user interface, the monitoring programming, when executed, capable of performing the following steps:
   identify in real-time a failure during execution of a control-related task;
   generate an incident report accessible by the incident management system;
   upon resolution of the incident, cause a restart of the control-related task at an audit control point associated with the failure;
   wherein the monitoring program is capable of:
      identifying scheduled, continuous, and real-time batches, tasks, and a history of task executions;
      displaying corresponding indicia on the monitor user interface in at least one of a monitoring view and a task view;
      updating the indicia in real-time, the indicia having user-selectable fields associated therewith; and
      retrieving task details in response to user selection, whereby the controls are continuously monitored by the monitoring programming.

9. The system of claim 1, wherein the GRC forms subsystem comprises programming, when executed in response to user selection, capable of performing the steps of:
   launch a GRC forms user interface;
   access data corresponding to controls and rules from the controls and rules repositories, respectively, to structure discrete ones of the rules into at least one corresponding control to create entries into a GRC form;
   validate operation of the entries with selected ones of the data objects;
   if the validation is successful, generate a corresponding new or updated one of the connection adapters; and
   link the GRC form to the rules repository.

10. A computer-implemented method of internal control management including steps executed by a computer processor implementing computer executable instructions, the steps, comprising: providing a plurality of dashboards generated by, and having user-selectable fields associated with the internal control management, one of the dashboards comprising a control monitoring scoreboard;
   simultaneously displaying on the scoreboard key performance indicators determined in real time, the key performance indicators comprising controls failed, related records scanned, tests performed, and associated risk scores;
   displaying the foregoing determinations on the scoreboard as user-perceptible indicia;
   displaying detail records of respective ones of the key performance indicators in response to user selection of an associated field on the scoreboard;
   on-boarding data by performing the following computer-implemented steps in response to user input through a RESTful application programming interface: at least one of creating a first data flow mapping corresponding to a first data source programming interface source object to be on-boarded and editing a previously created, second data flow mapping corresponding to a second data source object;
   dragging and dropping at least one of the data source objects to be on-boarded into a first logical work space accessible from the RESTful application programming interface;
   selecting a predetermined connection for the dropped data source object from a plurality of the connections;
   and generating a source qualifier and default select query for the dropped data source object;
   executing the data flow mappings to generate associated run statistics, and displaying in real-time first indicia corresponding to the execution of the data flow mappings;
   wherein the steps of creating the first data flow mapping and editing the second data flow mapping comprise: developing and validating the data flow mappings using transformation objects selected from the group consisting of Joiner, Filter, Lookup, Router, Cache, Expression, and JAVA/Scala/Python/R transformations and connecting to target definitions after validation of the data flow mappings;

wherein the steps of dragging and dropping and connecting to the target definitions are executable in a manner agnostic to script language associated with the source object and the target definition;

accessing one of a plurality of databases to retrieve an existing control name having a first control mapping associated therewith and defined in a GRC form in a tree view folder associated with a control category;

transferring the control mapping to a second logical workspace accessible from the RESTful application programming interface;

dragging and dropping at least one of the data source objects into the second logical workspace;

developing and validating the control mapping using transformation objects selected from the group consisting of control mapper, SQL control, and control result sets; connecting to a control result set after validation of the control mapping;

executing the control mapping to generate a log associated with controls associated with the executed control mapping;

displaying in real-time second indicia corresponding to the execution of the control mapping;

maintaining control logic associated with the control mapping, irrespective of substitution of one of the data source objects of the control mapping with another one of the data source objects retrieved from the databases.

11. The method of claim 10, further comprising the steps of displaying indicia on a single, user-perceptible display screen, the indicia corresponding to performance of the controls being monitored by the system, the performance quantified by numbers determined for predetermined, corresponding periods of time, the displayed indicia corresponding to data determined by the control monitor, the quantitative data comprising functions, processes, risks, controls, completed and failed monitoring, incidents by status, batches executed by status, tasks executed by status, and issues by status.

12. The method of claim 10, further comprising the steps of configuring the data source objects into logical columns in the data flow mapping, displaying indicia corresponding to the logical columns in the RESTful API, and accessing data records associated with the data source objects corresponding to the logical columns through pipelined linkages.

13. The method of claim 10, further comprising the steps of:
providing a connections interface to access data sources, wherein the data sources are heterogeneous and comprise relational data sources, non-relational data sources, data related to ERP applications, data related to non-ERP applications, discrete ones of the data sources formatted in conformance with respective industry standards;
wherein the step of drag and drop of the data source object is performed by programming to receive any of the data source objects from the heterogeneous data sources, irrespective of the respective industry standards to which the data source object conforms and to place the data source objects into the first logical work space by means of respective ones of the connection adaptors corresponding to a respective one of the heterogeneous data sources.

14. The method of claim 10, further comprising the steps of:
enabling selection and scheduling of applications, batches, and tasks in real time and in any of the time intervals comprising continuous, intermittent, and one-time;
determining the results of the scheduling and displaying and updating indicia corresponding to the results of the scheduling through a single, user-perceptible display screen.

15. The method of claim 10, wherein the step of on-boarding comprises generating data flow mapping metadata and wherein the step of developing the control mapping comprises generating control mapping metadata, the generations of metadata for a plurality of the data flow mappings and the control mappings performed by instructions in a plurality of domain-specific programming language selected from the group consisting of JAVA, Python, and Scala.

16. The method of claim 10, comprising the steps of:
continuously monitoring the controls in real-time through a single, user-perceptible monitor user interface;
identifying in real-time a failure during execution of a control-related task;
generating an incident report in user-perceptible form; and
upon resolution of the incident, causing a restart of the control-related task at an audit control point associated with the failure.

17. The method of claim 10, further comprising the steps of:
identifying scheduled, continuous, and real-time batches, tasks, and a history of task executions;
displaying in user-perceptible form indicia corresponding to the batches and tasks;
updating the indicia in real-time to continuously monitor the controls, the indicia having user-selectable fields associated therewith.

18. The method of claim 10, further comprising the steps of:
launching a GRC forms user interface;
accessing data corresponding to controls and rules to structure discrete ones of the rules into at least one corresponding control to create entries into a GRC form;
validating operation of the entries with selected ones of the data objects;
if the validation is successful, generating a corresponding connection adapters; and
linking the GRC form to a rules repository.

* * * * *

UNITED STATES PATENT AND TRADEMARK OFFICE
CERTIFICATE OF CORRECTION

| | |
|---|---|
| PATENT NO. | : 11,748,680 B2 |
| APPLICATION NO. | : 17/181992 |
| DATED | : September 5, 2023 |
| INVENTOR(S) | : Ashok Panigrahi et al. |

It is certified that error appears in the above-identified patent and that said Letters Patent is hereby corrected as shown below:

On the Title Page

Item (72), The following inventor should be added:
Prudhvi Madasu, Hyderabad (IN)

Signed and Sealed this
First Day of April, 2025

Coke Morgan Stewart
*Acting Director of the United States Patent and Trademark Office*